(12) United States Patent
Goto

(10) Patent No.: US 12,530,972 B2
(45) Date of Patent: Jan. 20, 2026

(54) DRIVER ASSISTANCE SYSTEM, VEHICLE, NON-TRANSITORY RECORDING MEDIUM CONTAINING COMPUTER PROGRAM, AND DRIVER ASSISTANCE METHOD

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 40 days.

(21) Appl. No.: 18/737,194

(22) Filed: Jun. 7, 2024

(65) Prior Publication Data

US 2024/0331545 A1 Oct. 3, 2024

Related U.S. Application Data

(63) Continuation of application No. PCT/JP2022/044339, filed on Dec. 1, 2022.

(51) Int. Cl.
*G08G 1/16* (2006.01)
*G08G 1/0967* (2006.01)
*H04W 4/40* (2018.01)

(52) U.S. Cl.
CPC ....... *G08G 1/166* (2013.01); *G08G 1/096708* (2013.01); *G08G 1/164* (2013.01); *H04W 4/40* (2018.02)

(58) Field of Classification Search
CPC .. G08G 1/166; G08G 1/096708; G08G 1/164; G08G 1/09; G08G 1/16
See application file for complete search history.

(56) References Cited

U.S. PATENT DOCUMENTS

2011/0006913 A1 1/2011 Chen et al.
2019/0329770 A1 10/2019 Rajab et al.

FOREIGN PATENT DOCUMENTS

JP 2000-057476 A 2/2000
JP 2001-126196 A 5/2001
(Continued)

OTHER PUBLICATIONS

Machine Translation of Junko's reference (JP-2004021302-A) (Year: 2004).*
(Continued)

*Primary Examiner* — Tarek Elarabi
(74) *Attorney, Agent, or Firm* — Rimon P.C.

(57) ABSTRACT

A driver assistance system for assisting in driving a vehicle includes at least one processor and at least one memory communicatably coupled to the processor. Upon providing the vehicle with driver assistance in a predetermined area including installation spots where observation sensors are installed and travel routes are present from a first installation spot to a second installation spot, the processor: carries out information acquisition processing of acquiring frequency information for each combination of the first and second installation spots that indicating frequency at which passing vehicles that have passed the first installation spot pass the second installation spot; and carries out estimation processing of estimating possibility of collision between a vehicle of which a planned travel route in the predetermined area is recognizable, and a random vehicle devoid of a road-to-vehicle communication function to communicate with the observation sensor, based on the acquired frequency information.

9 Claims, 19 Drawing Sheets

(56) References Cited

FOREIGN PATENT DOCUMENTS

| | | | |
|---|---|---|---|
| JP | 2004021302 A | * | 1/2004 |
| JP | 2004-171269 A | | 6/2004 |
| JP | 2008-065480 A | | 3/2008 |
| JP | 2010-170259 A | | 8/2010 |
| JP | 2019-192228 A | | 10/2019 |

OTHER PUBLICATIONS

Office Action issued on Nov. 5, 2024, in corresponding Japanese patent application No. 2024-525246, 5 pages.
International Search Report received in PCT Application No. PCT/JP2022/044339, dated Feb. 14, 2023, w/ English Translation.

* cited by examiner

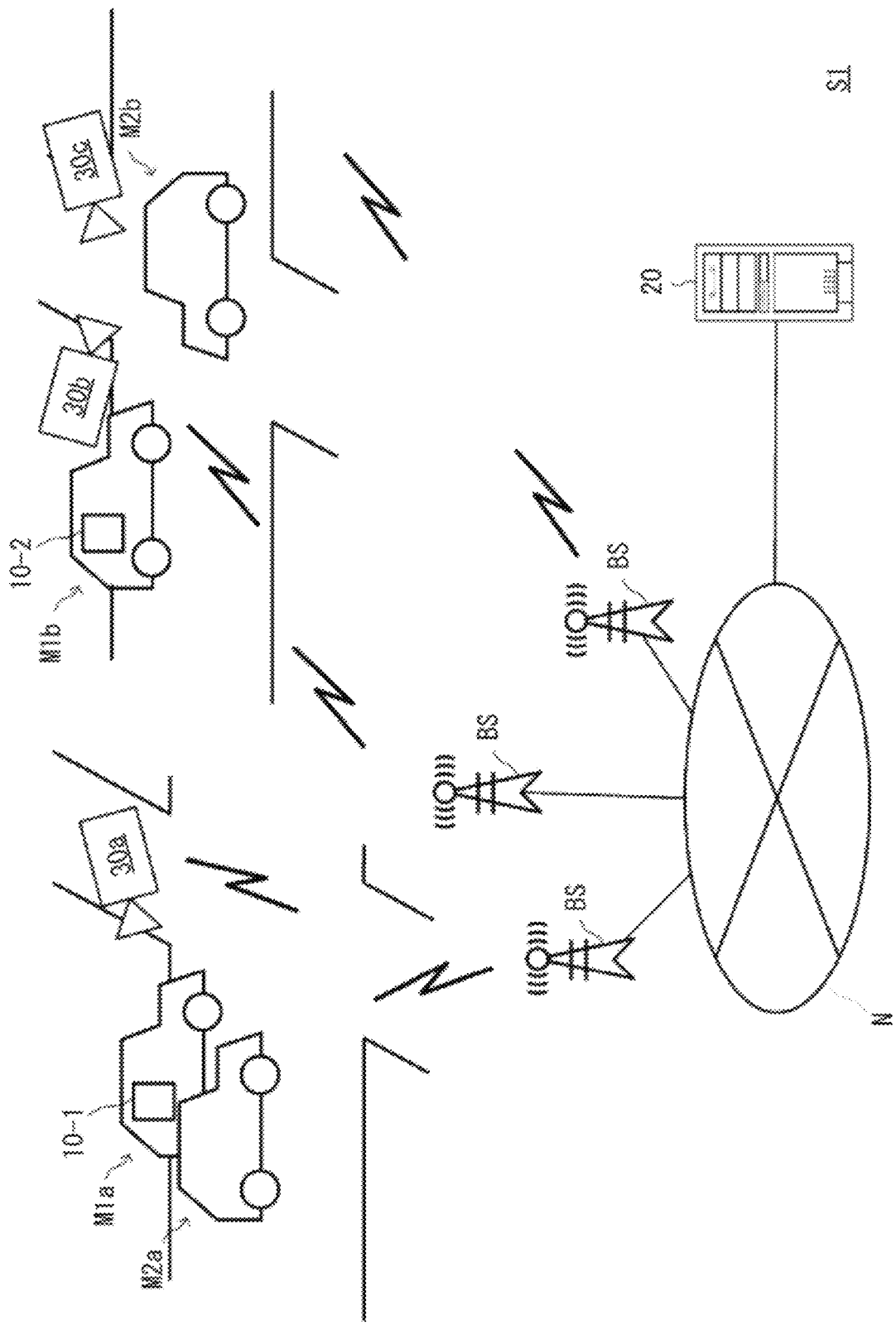
[FIG. 1]

[FIG. 2]
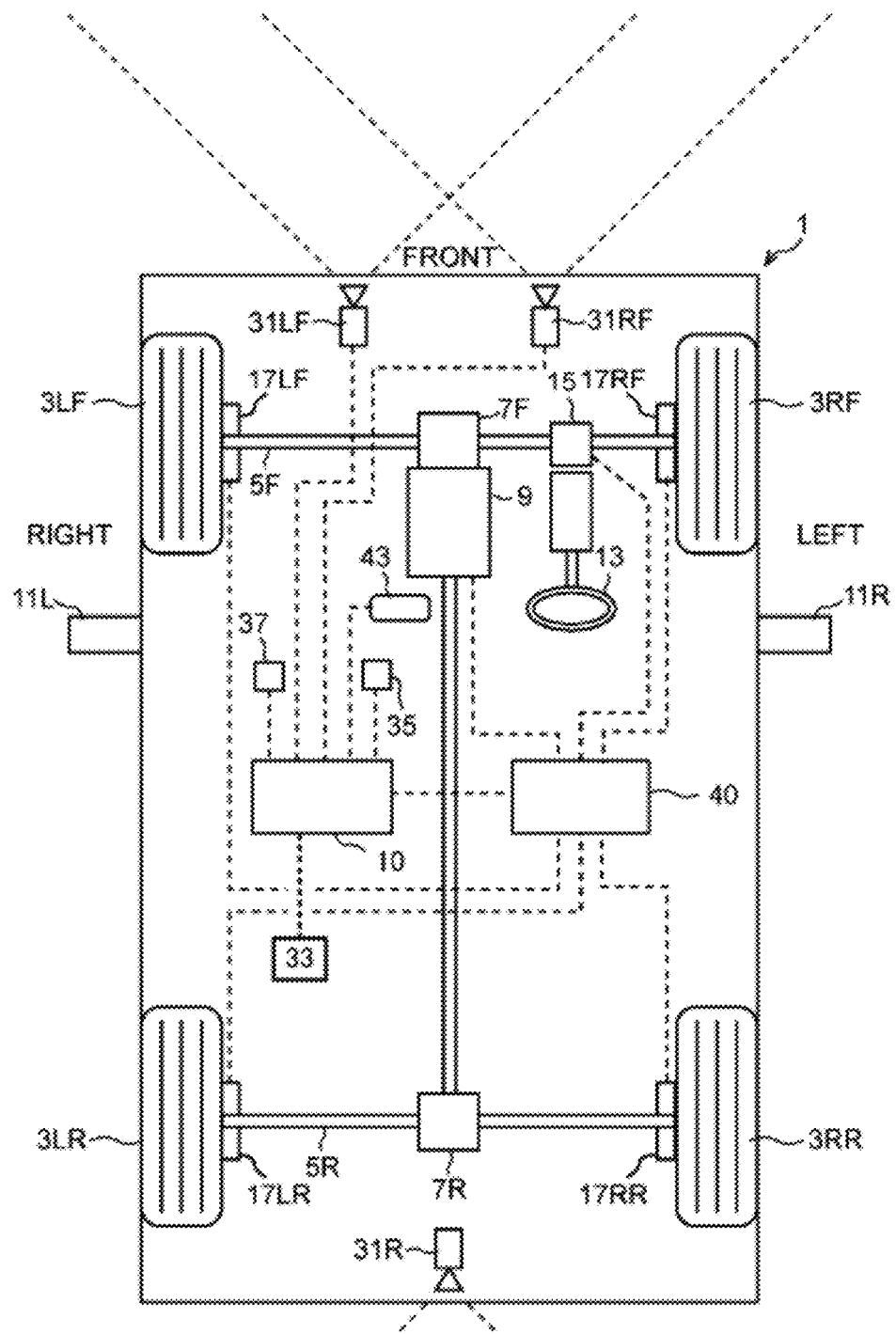

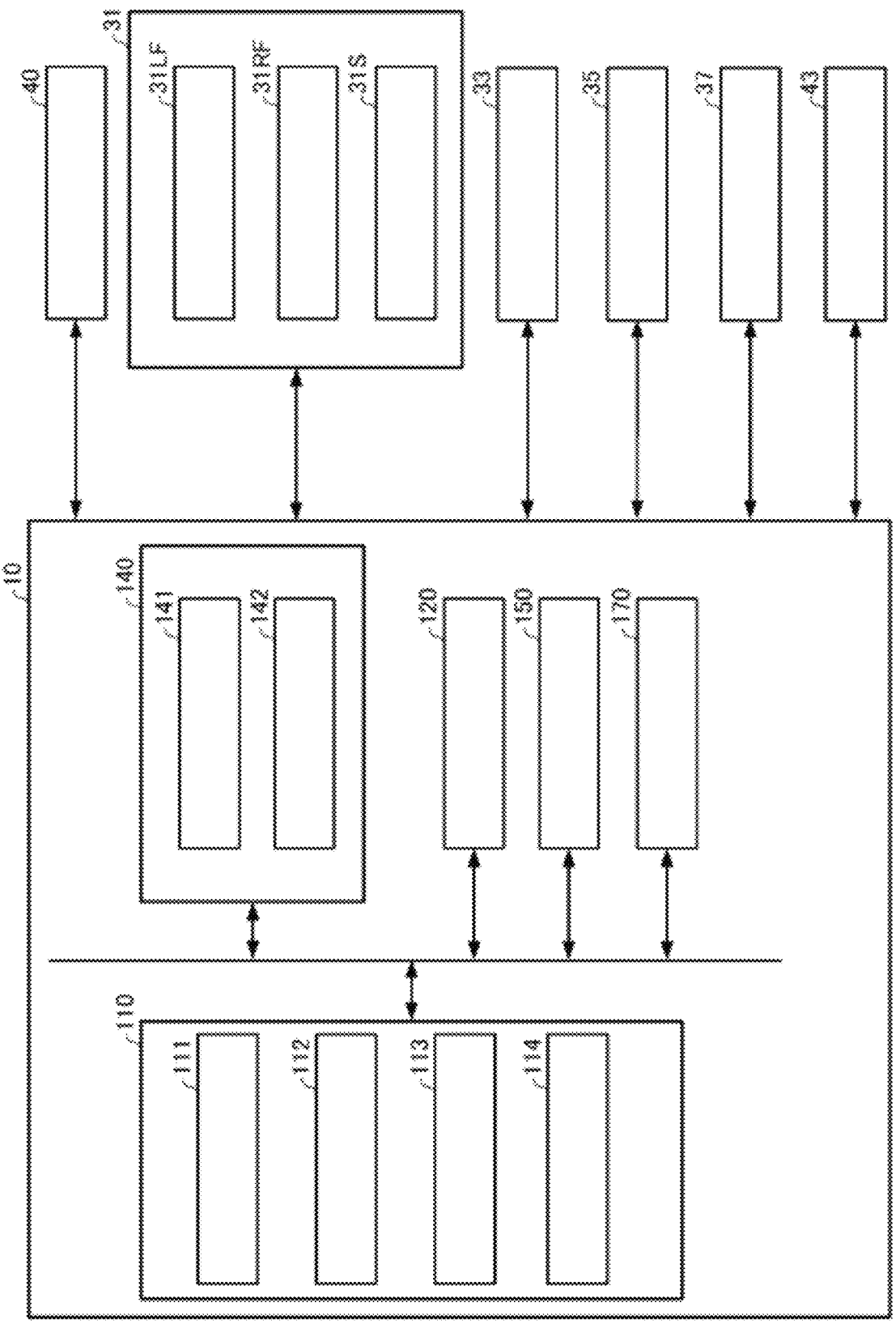

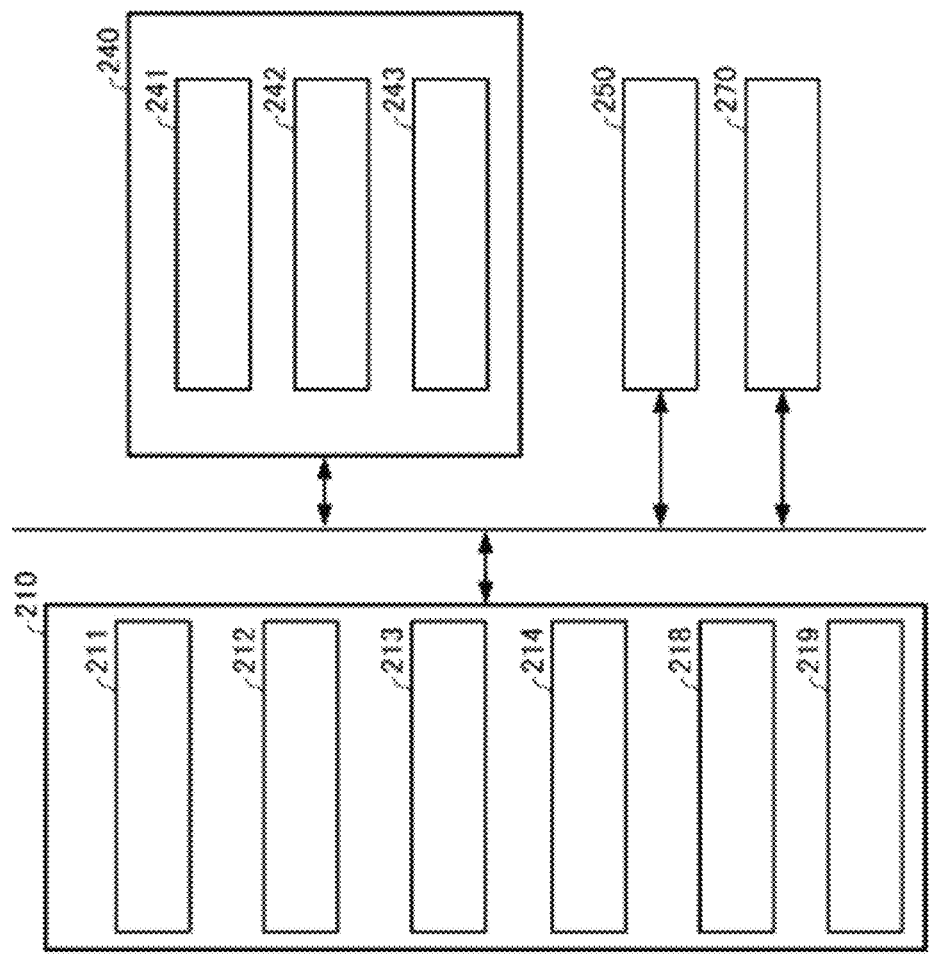

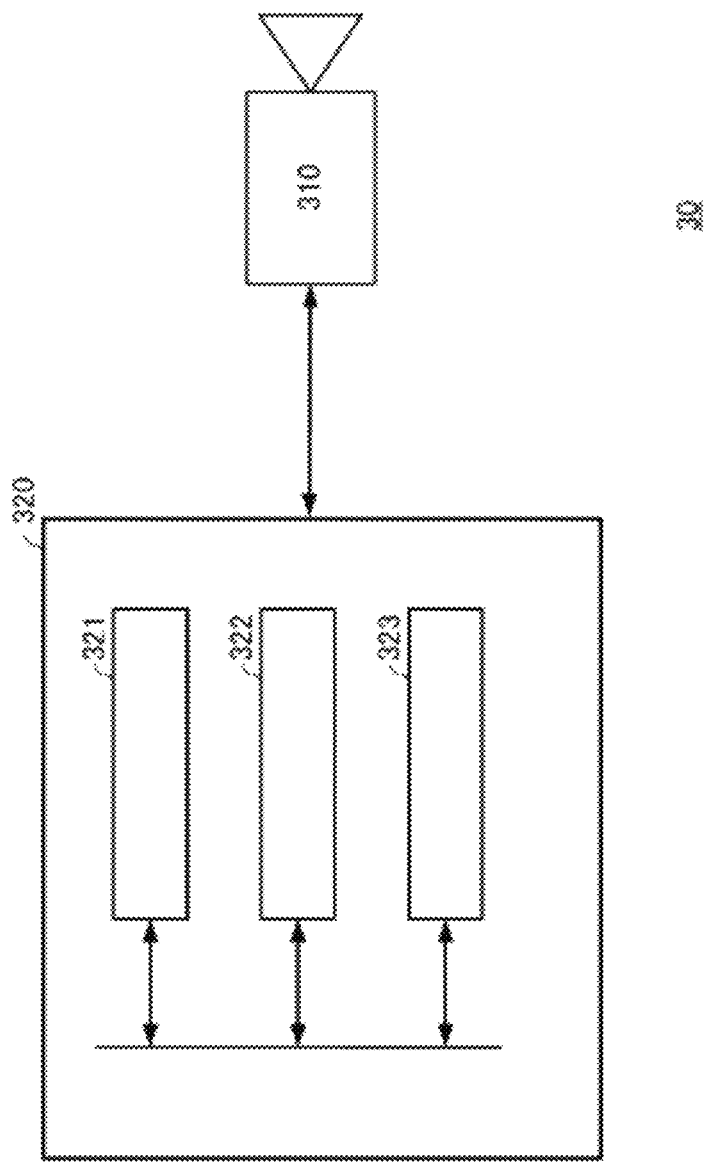
[FIG. 5]

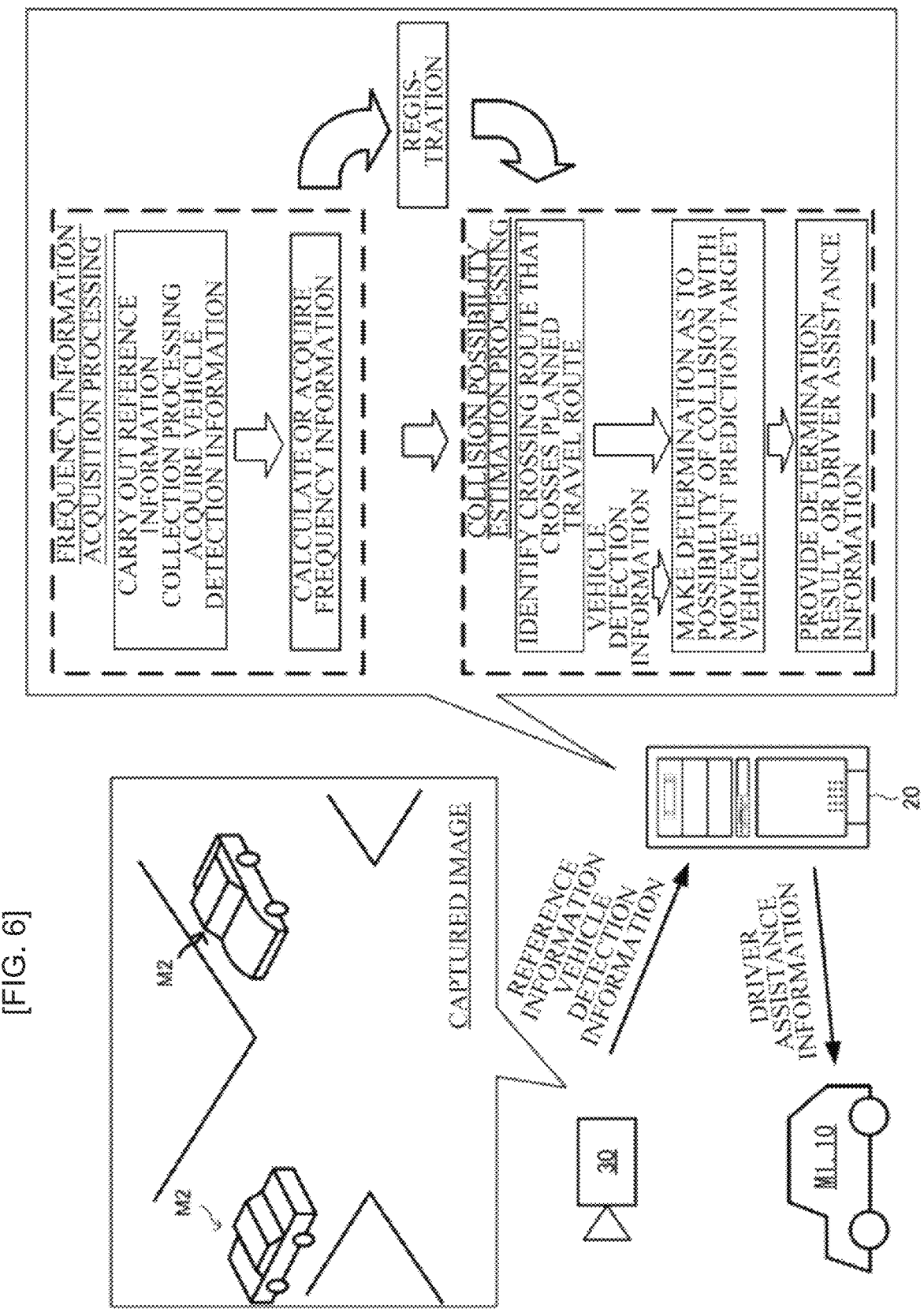
[FIG. 6]

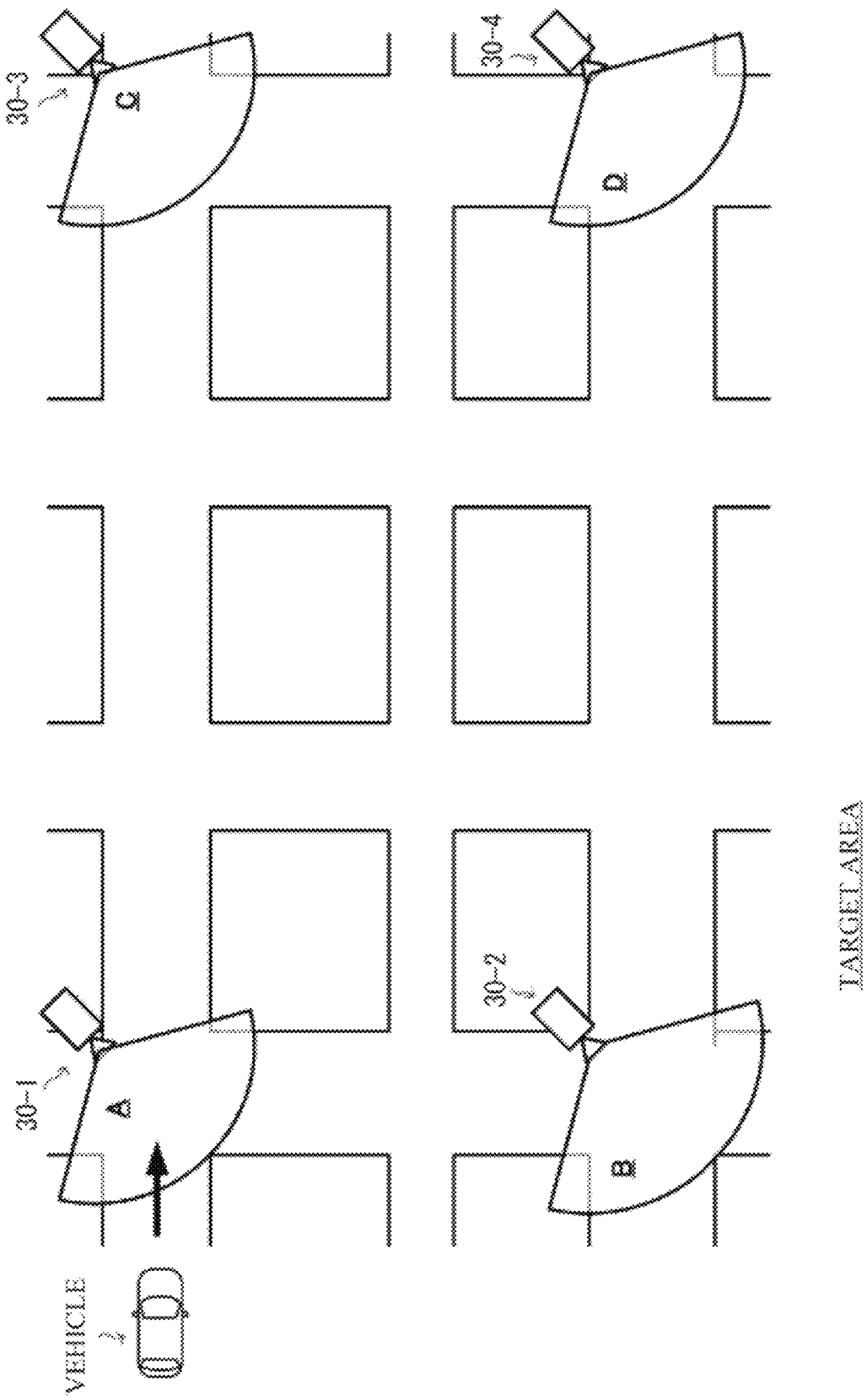

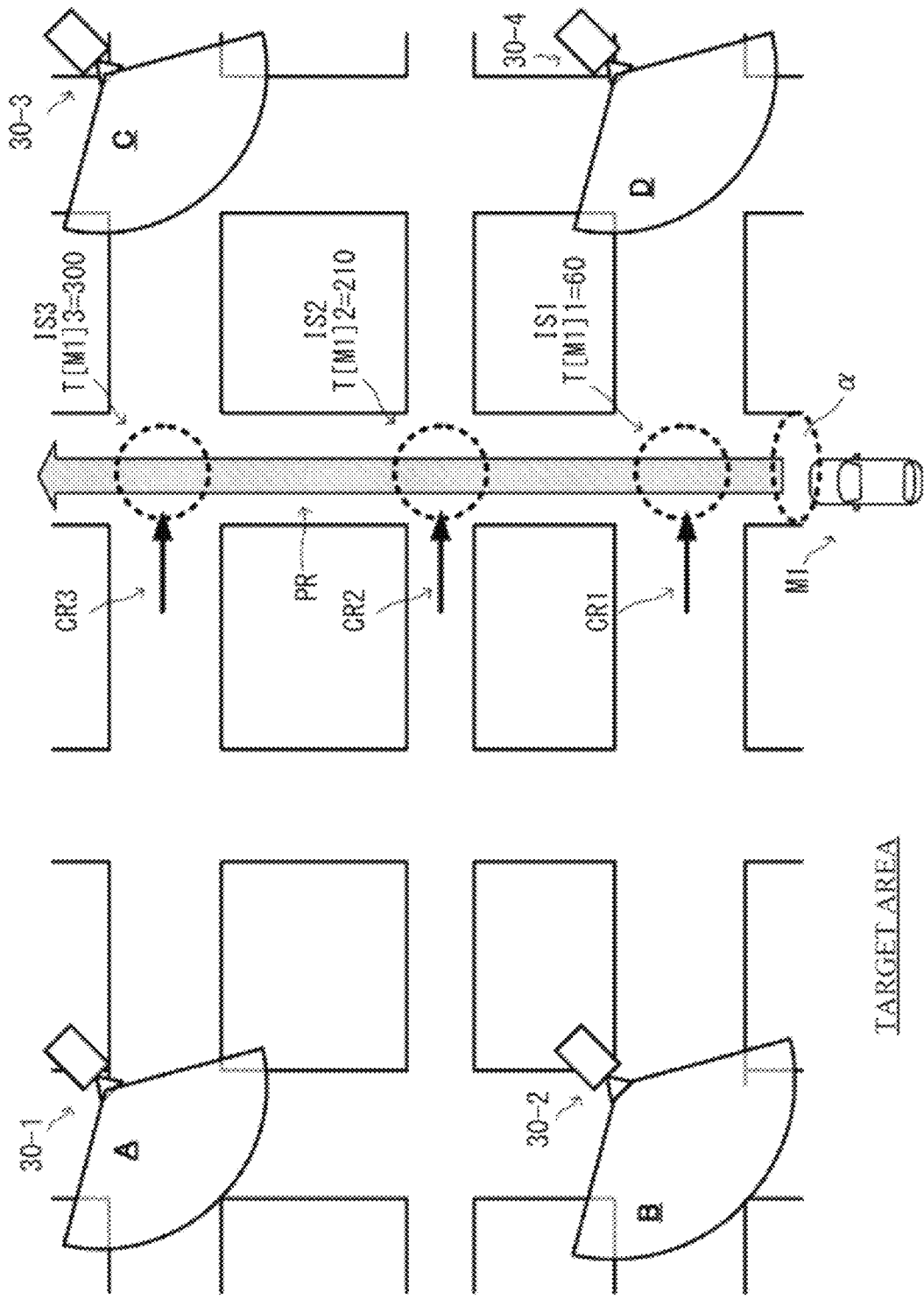
[FIG. 8]

[FIG. 9]
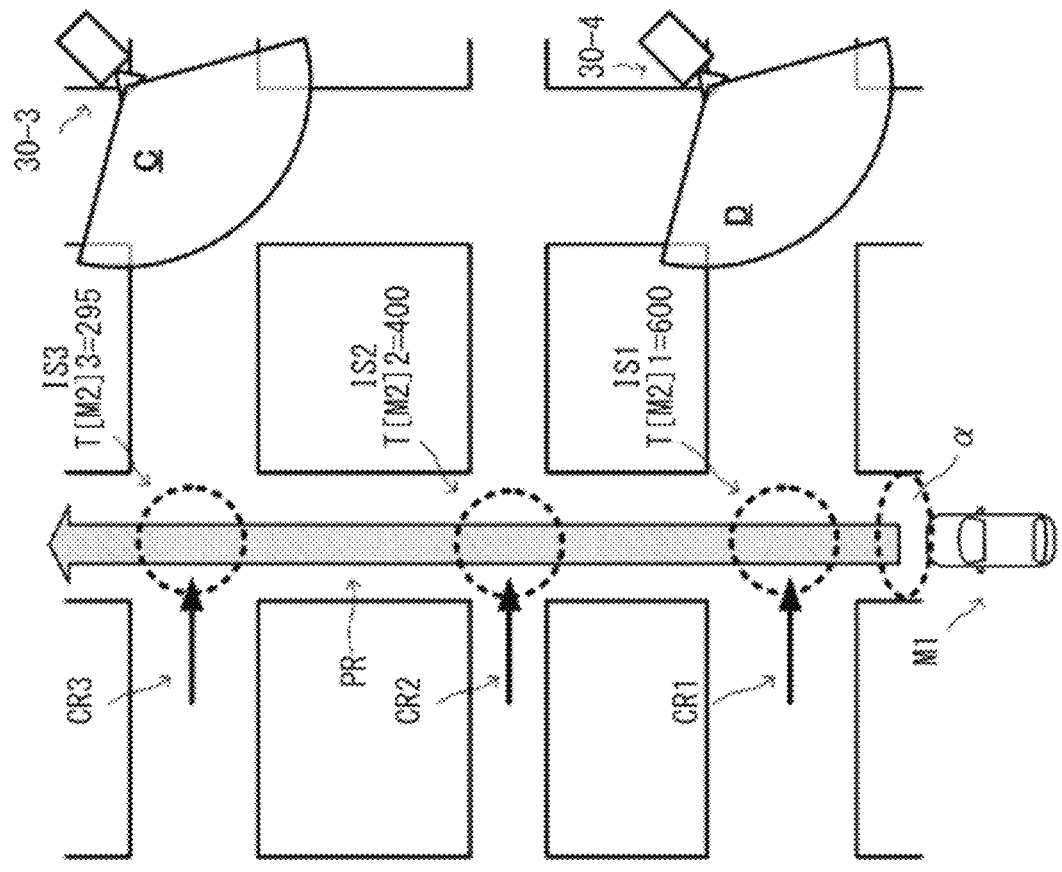
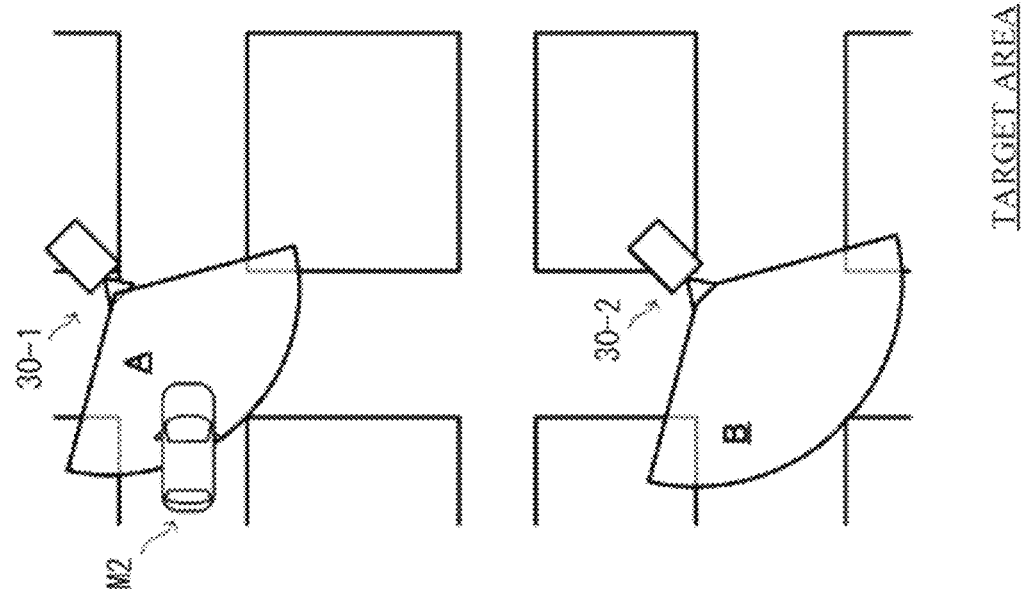
TARGET AREA

[FIG. 10]
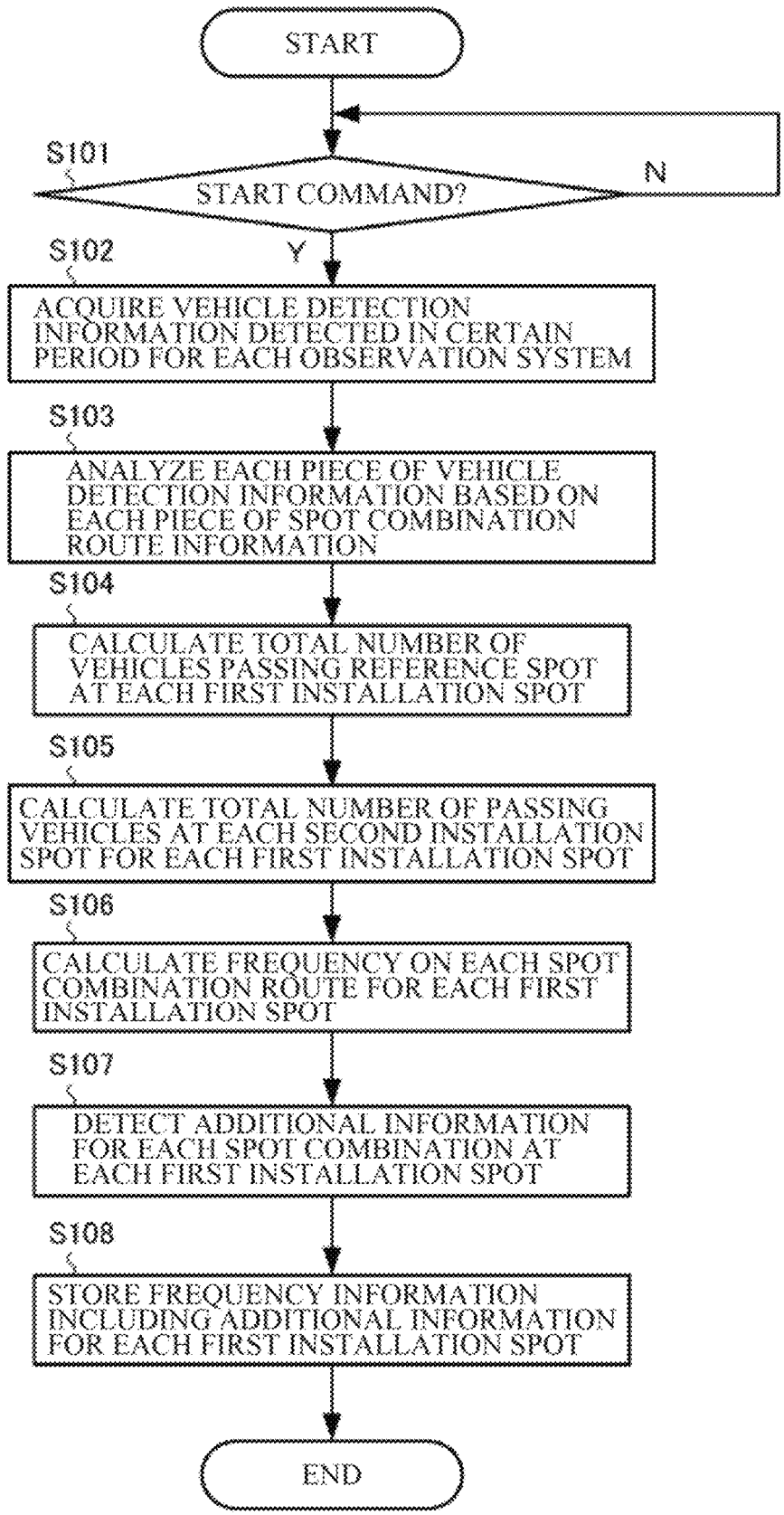

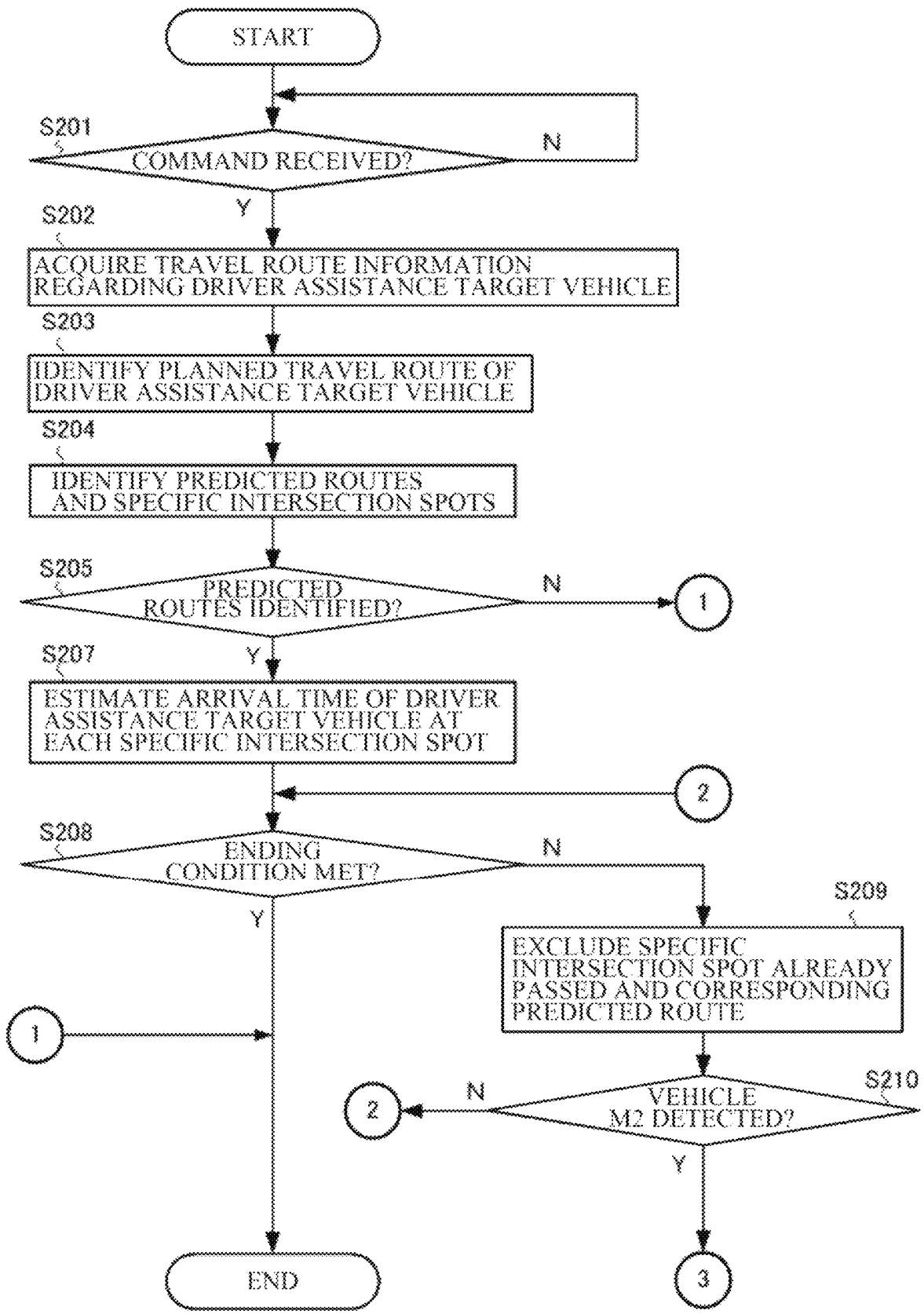
[FIG. 11]

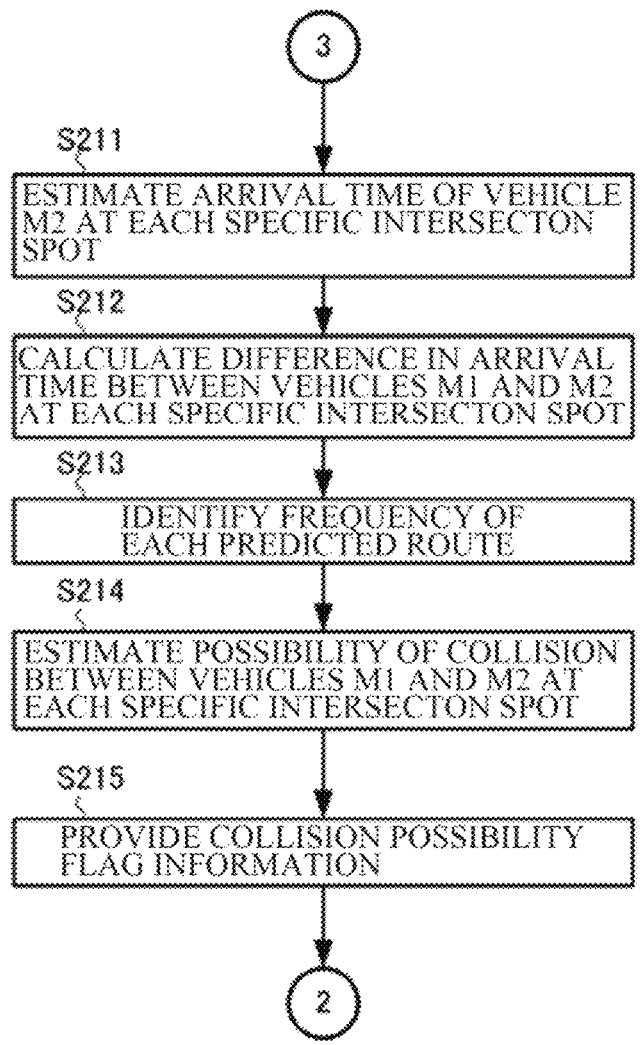
[FIG. 12]

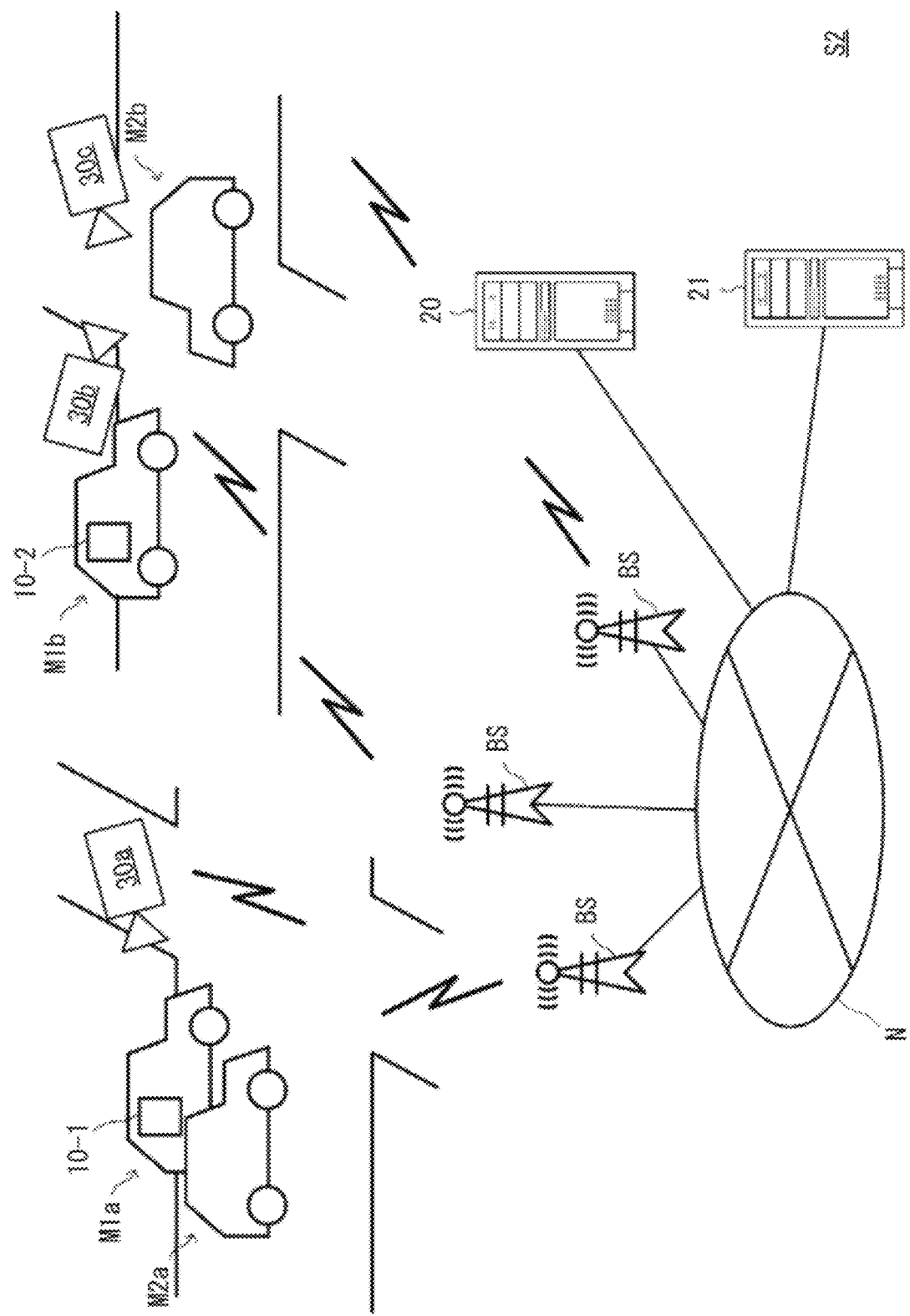
[FIG. 13]

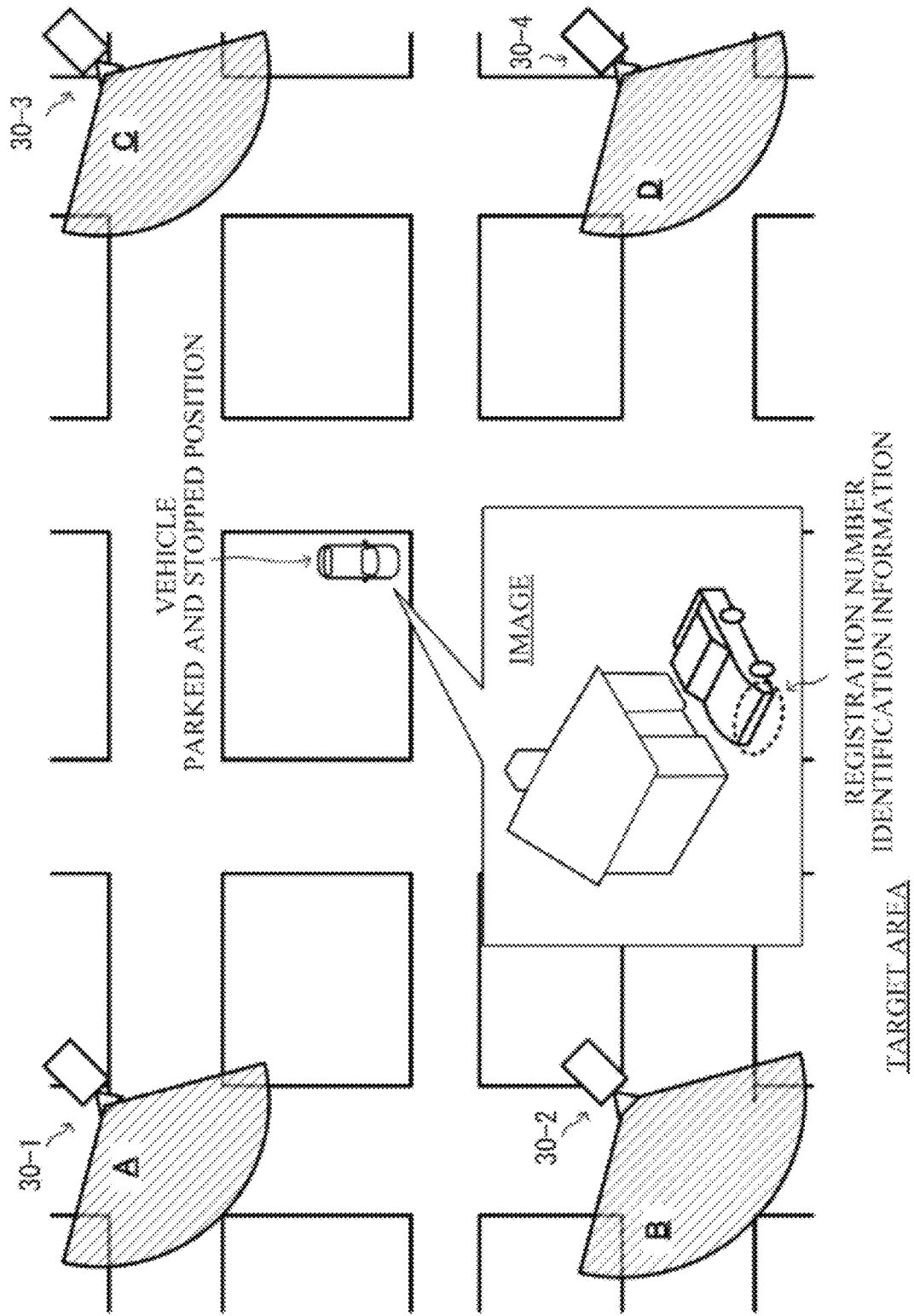

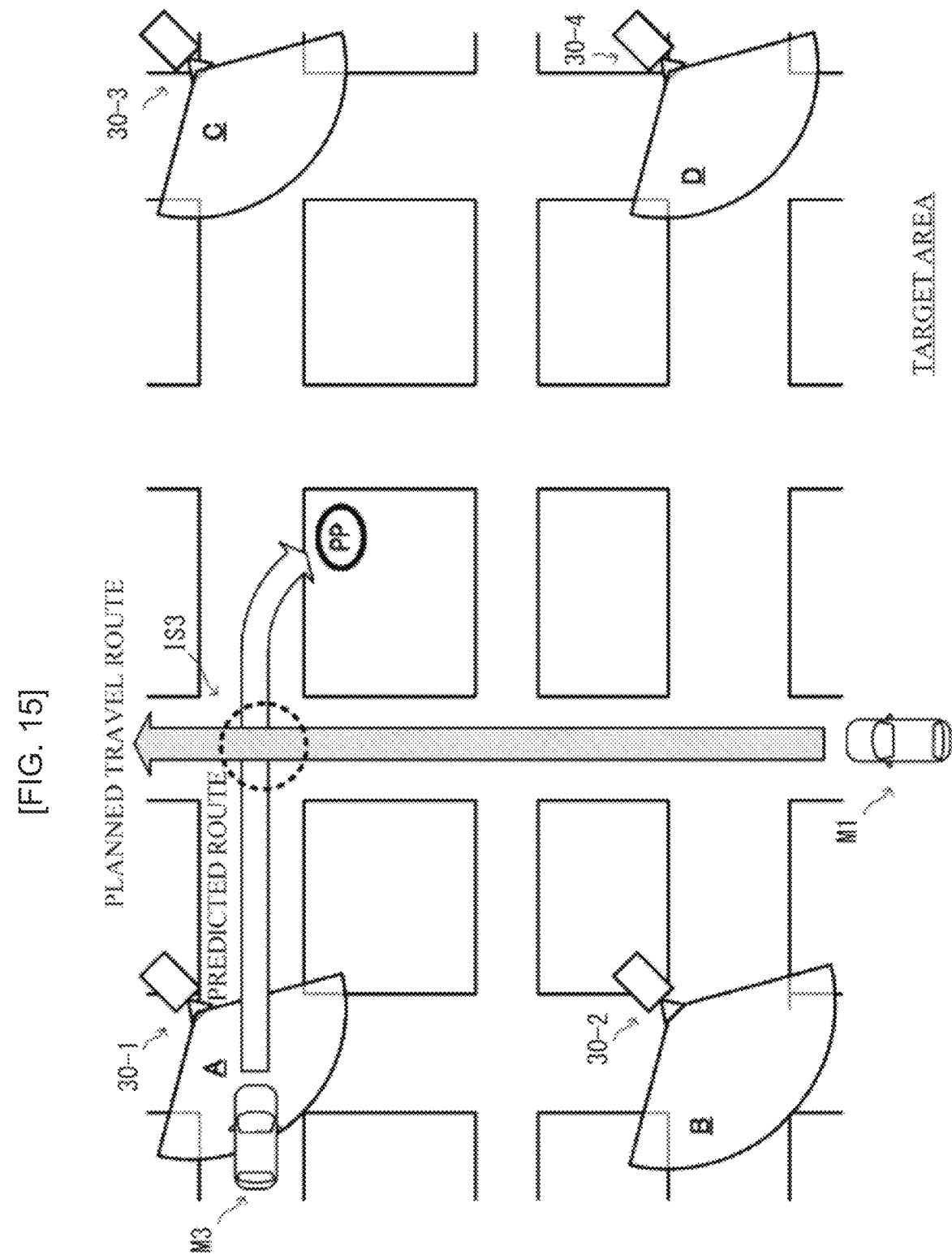

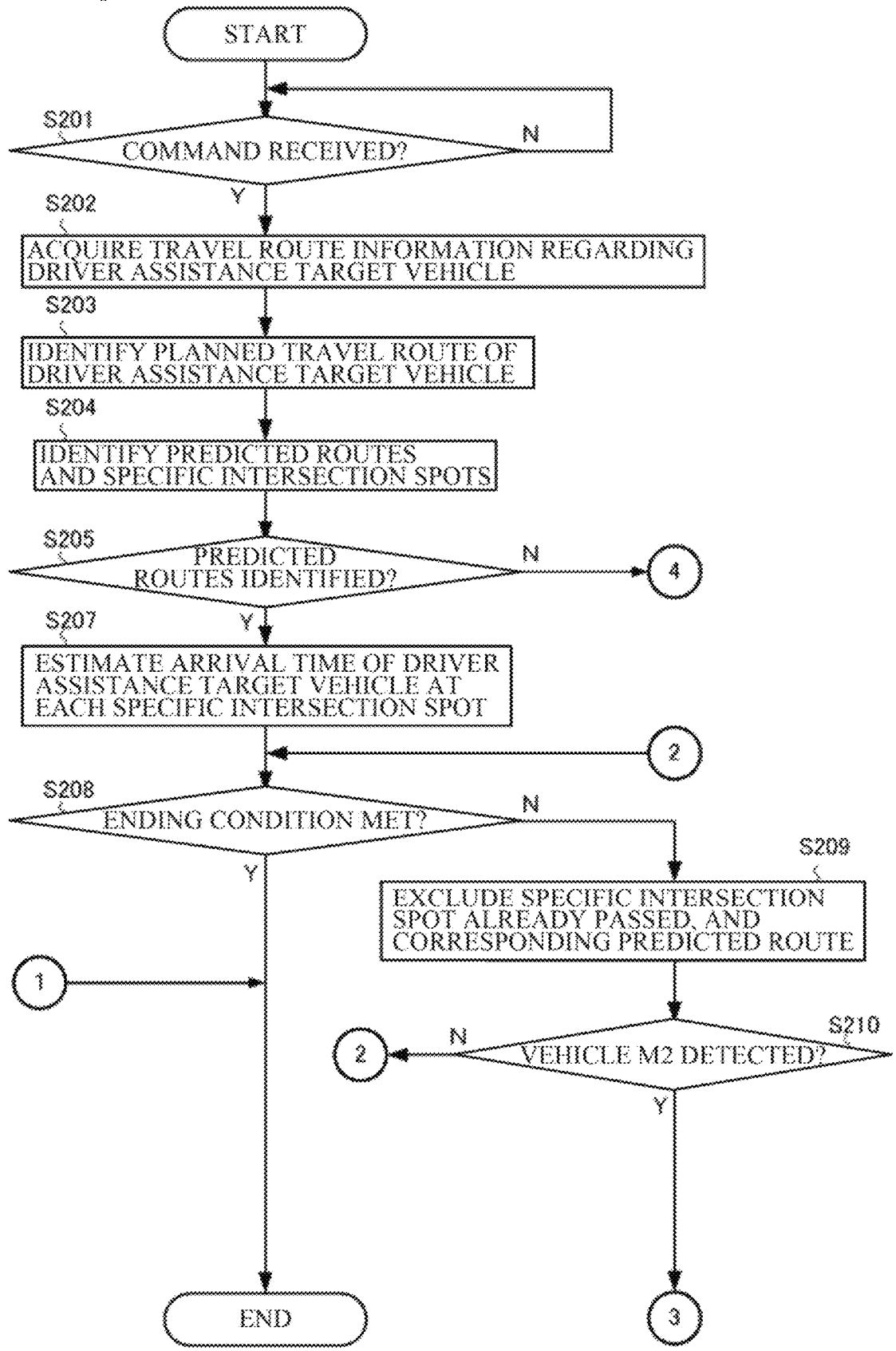
[FIG. 16]

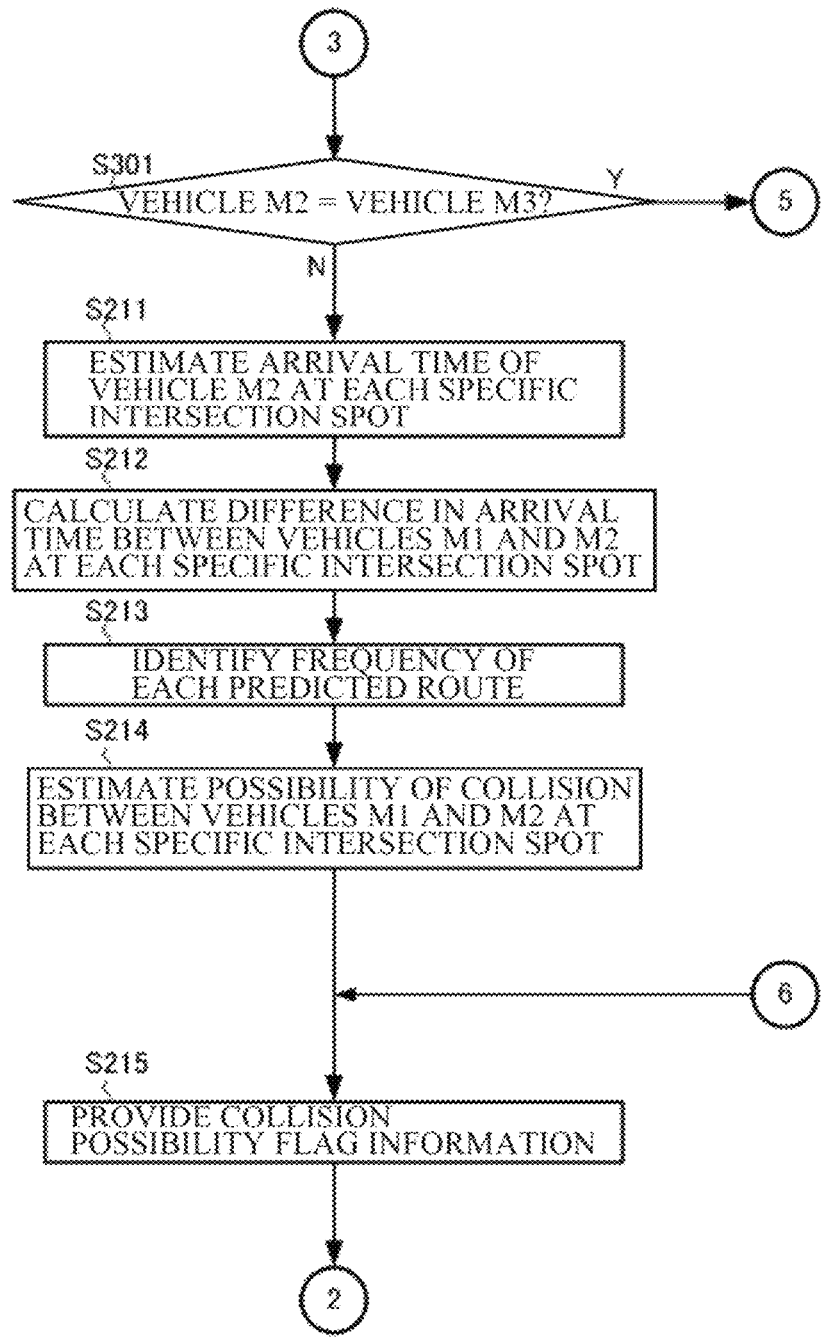

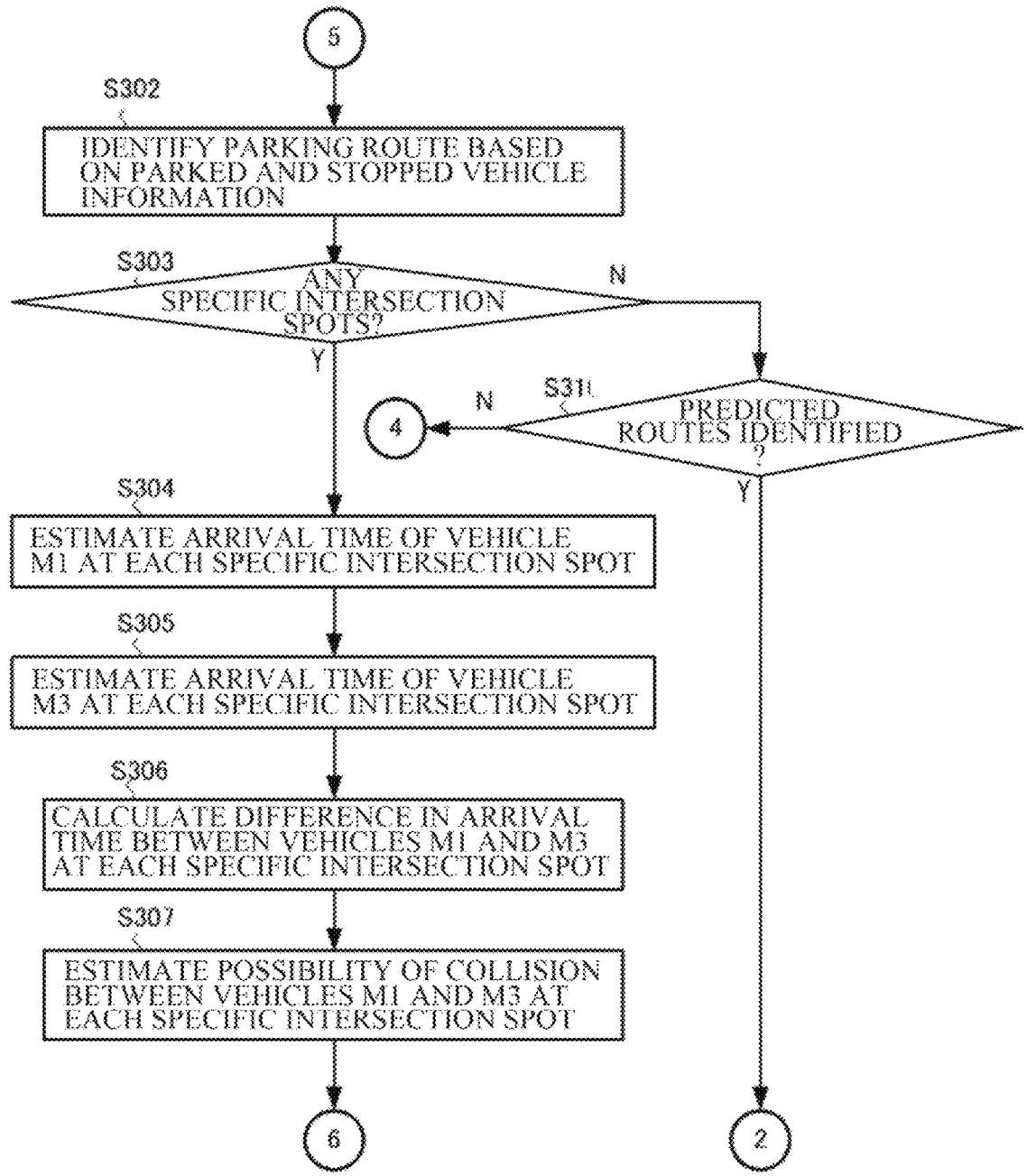

[ FIG. 19 ]
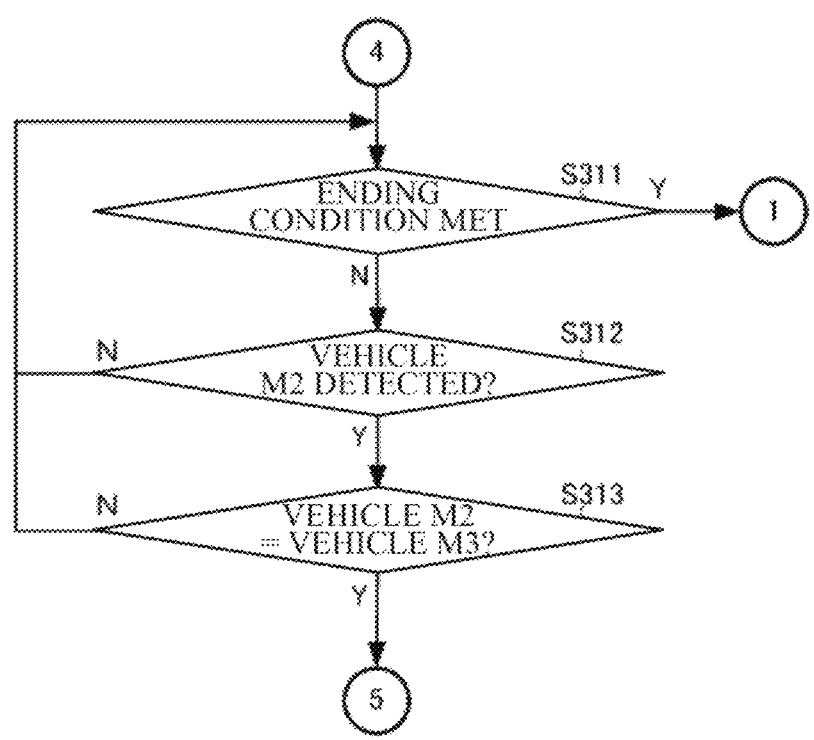

DRIVER ASSISTANCE SYSTEM, VEHICLE, NON-TRANSITORY RECORDING MEDIUM CONTAINING COMPUTER PROGRAM, AND DRIVER ASSISTANCE METHOD

CROSS-REFERENCE TO RELATED APPLICATIONS

This application is continuation of International Application No. PCT/JP2022/044339, filed on Dec. 1, 2022, the entire contents of which are hereby incorporated by reference.

BACKGROUND

The disclosure relates to a driver assistance system, a vehicle, a recording medium containing a computer program, and a driver assistance method.

In recent years, research and development related to automated driving technology and driver assistance technology have been in progress for the purpose of prevention and reduction of accidents, and reduction in a load of driving. In the automated driving technology or the driver assistance technology, it is desirable to obtain a driving result that makes a driver feel relieved.

Moreover, conventionally, for the purpose of contribution to traffic safety on a road, proposals have been made for technology related to assistance in safety in which, when there is a risk such as a collision accident, such a risk is notified in advance to, for example, a driver who drives a vehicle.

Furthermore, there has been various kinds of such technology related to the assistance in safety. In addition to prevention of collision accidents between automobiles, there has emerged technology of prevention of collision accidents between automobiles and moving bodies such as bicycles and pedestrians.

For example, as a typical system employing such technology, an obstacle collision prevention system has been known in which an observation sensor such as a monitoring camera is installed on a road, for example, at an intersection spot. The observation sensor observes movement of vehicles. The obstacle collision prevention system utilizes information regarding each vehicle provided by the observation sensor.

Specifically, this obstacle collision prevention system is configured to allow the observation sensor to provide each vehicle with information regarding movement of other vehicles. Based on the information, the obstacle collision prevention system is configured to give an alarm or make an automatic control to avoid collision with other vehicles (for example, Patent Literature 1: Japanese Unexamined Patent Application Publication No. 2001-126196).

SUMMARY

However, in the system described in Patent Literature 1, it is difficult to cooperate with vehicles as other vehicles that do not have a vehicle-to-vehicle communication function or a road-to-vehicle communication function such as an in-vehicle communication device, e.g., a data communication module. Thus, as for the system described in Patent Literature 1, in the first place, it is not possible to even use the system at an intersection spot and the like without the observation sensor.

The disclosure has been made in view of the problem mentioned above, to provide a driver assistance system and the like that make it possible, even when a route or the like of a vehicle as a monitoring target is not sufficiently recognized, to enhance prediction accuracy of its movement, precisely avoid collision with the monitoring target, and provide safer driver assistance.

Means for Solving the Problem

To solve the above-described problem, a driver assistance system according to a first aspect of the disclosure has a configuration as follows.

A driver assistance system that assists in driving a vehicle, including:
  one or more processors; and one or more memories communicatably coupled to the one or more processors, in which
  the one or more processors are configured to
  upon providing the vehicle with driver assistance in a predetermined area that is an area including installation spots at which respective observation sensors are installed and in which travel routes are present from a first installation spot to a second installation spot out of the installation spots, the second installation spot being different from the first installation spot,
    carry out information acquisition processing of acquiring frequency information for each combination of the first installation spot and the second installation spot, the frequency information indicating frequency at which passing vehicles that have passed the first installation spot pass the second installation spot, and
    carry out estimation processing of estimating possibility of collision between a subject vehicle of which a planned travel route in the predetermined area is recognizable, and a random vehicle devoid of a road-to-vehicle communication function to communicate with the observation sensor, based on each piece of the acquired frequency information for each combination of the installation spots.

A vehicle according to a second aspect of the disclosure has a configuration as follows.

A vehicle provided with a driver assistance apparatus configured to assist in driving the vehicle, in which
  the driver assistance apparatus is configured to
  upon providing the vehicle with driver assistance in a predetermined area that is an area including installation spots at which respective observation sensors are installed and in which travel routes are present from a first installation spot to a second installation spot out of the installation spots, the second installation spot being different from the first installation spot,
    carry out information acquisition processing of acquiring frequency information for each combination of the first installation spot and the second installation spot, the frequency information indicating frequency at which passing vehicles that have passed the first installation spot pass the second installation spot, and
    carry out estimation processing of estimating possibility of collision between a subject vehicle of which a planned travel route in the predetermined area is recognizable, and a random vehicle devoid of a road-to-vehicle communication function to communicate with the observation sensor, based on each piece of the acquired frequency information for each combination of the installation spots.

A non-transitory recording medium containing a computer program according to a third aspect of the disclosure has a configuration as follows.

A non-transitory recording medium containing a computer program to be applied to a driver assistance apparatus that assists in driving a vehicle, the computer program causing a computer to:
when providing the vehicle with driver assistance in a predetermined area that is an area including installation spots at which respective observation sensors are installed and in which travel routes are present from a first installation spot to a second installation spot out of the installation spots, the second installation spot being different from the first installation spot, carry out information acquisition processing of acquiring frequency information for each combination of the first installation spot and the second installation spot, the frequency information indicating frequency at which passing vehicles that have passed the first installation spot pass the second installation spot; and carry out estimation processing of estimating possibility of collision between a subject vehicle of which a planned travel route in the predetermined area is recognizable, and a random vehicle devoid of a road-to-vehicle communication function to communicate with the observation sensor, based on each piece of the acquired frequency information for each combination of the installation spots.

A driver assistance method according to a fourth aspect of the disclosure has a configuration as follows.

A driver assistance method including assisting in driving a vehicle, the driver assistance method including:
when providing the vehicle with driver assistance in a predetermined area that is an area including installation spots at which respective observation sensors are installed and in which travel routes are present from a first installation spot to a second installation spot out of the installation spots, the second installation spot being different from the first installation spot, carrying out information acquisition processing of acquiring frequency information for each combination of the first installation spot and the second installation spot, the frequency information indicating frequency at which passing vehicles that have passed the first installation spot pass the second installation spot; and carrying out estimation processing of estimating possibility of collision between a subject vehicle of which a planned travel route in the predetermined area is recognizable, and a random vehicle devoid of a road-to-vehicle communication function to communicate with the observation sensor, based on each piece of the acquired frequency information for each combination of the installation spots.

According to the driver assistance system and the like of the disclosure, it is possible to avoid collision between a vehicle as a target of driver assistance, e.g., the subject vehicle, and a vehicle of which movement is difficult to detect, e.g., a vehicle devoid of a road-to-vehicle communication function and the like. Hence, it is possible to provide safer driver assistance.

BRIEF DESCRIPTION OF DRAWINGS

FIG. 1 is a system configuration diagram illustrating a configuration of a driver assistance network system according to a first embodiment of the disclosure.

FIG. 2 is a schematic diagram illustrating a configuration example of a driver assistance target vehicle of the first embodiment.

FIG. 3 is an example of a system configuration diagram illustrating a configuration of a driver assistance system to be mounted on the driver assistance target vehicle of the first embodiment.

FIG. 4 is a block diagram illustrating an example of a configuration of a management server according to the first embodiment.

FIG. 5 is a diagram illustrating an example of a configuration of an observation system of the first embodiment.

FIG. 6 is a diagram for description of driver assistance information provision processing to be carried out by the management server of the first embodiment.

FIG. 7 is a diagram for description of a spot combination and a spot combination route in the first embodiment.

FIG. 8 is a diagram for description of collision possibility estimation processing to be carried out by the management server of the first embodiment.

FIG. 9 is a diagram for the description of the collision possibility estimation processing to be carried out by the management server of the first embodiment.

FIG. 10 is a flowchart illustrating operation of frequency information acquisition processing to be carried out by the management server of the first embodiment.

FIG. 11 is a flowchart illustrating operation of the driver assistance information provision processing to be carried out by the management server of the first embodiment.

FIG. 12 is a flowchart illustrating the operation of the driver assistance information provision processing to be carried out by the management server of the first embodiment.

FIG. 13 is a system configuration diagram illustrating a configuration of a driver assistance network system according to a second embodiment of the disclosure.

FIG. 14 is a diagram for description of parked and stopped vehicle information acquisition processing to be carried out by a management server of the second embodiment.

FIG. 15 is a diagram for description of collision possibility estimation processing to be carried out by the management server of the second embodiment.

FIG. 16 is a flowchart illustrating operation of driver assistance information provision processing to be carried out by the management server of the second embodiment.

FIG. 17 is a flowchart illustrating the operation of the driver assistance information provision processing to be carried out by the management server of the second embodiment.

FIG. 18 is a flowchart illustrating the operation of the driver assistance information provision processing to be carried out by the management server of the second embodiment.

FIG. 19 is a flowchart illustrating the operation of the driver assistance information provision processing to be carried out by the management server of the second embodiment.

DETAILED DESCRIPTION (A) Features of Embodiments of the Disclosure (1) An embodiment of the disclosure has a configuration as follows.

A driver assistance system that assists in driving a vehicle, including:

one or more processors; and one or more memories communicatably coupled to the one or more processors, in which when the processors provide the vehicle with driver assistance in a predetermined area that is an area including multiple installation spots at which respective observation sensors are installed and in which multiple travel routes are present from a first installation spot to a second installation spot out of the multiple installation spots, the second installation spot being different from the first installation spot, the processors carry out information acquisition processing of acquiring frequency information for each combination of the first installation spot and the second installation spot, the frequency information indicating frequency at which passing vehicles that have passed the first installation spot pass the second installation spot, and carry out estimation processing of estimating possibility of collision between a subject vehicle of which a planned travel route in the predetermined area is recognizable, and a random vehicle devoid of a road-to-vehicle communication function to communicate with the observation sensor, based on each piece of the acquired frequency information for each combination of the installation spots.

It is to be noted that the embodiment of the disclosure may be implemented by a vehicle including a driver assistance system that carries out the processing mentioned above, a recording medium containing a computer program to carry out the processing mentioned above, or a driver assistance method including carrying out the processing mentioned above.

With this configuration, in the driver assistance system and the like of the disclosure, by using data regarding collection of actual movement of vehicles, it is possible to precisely predict movement of an undetectable vehicle of which a current position on a road, a route, and the like are undetectable. The undetectable vehicle includes, for example, a vehicle devoid of a road-to-vehicle communication function.

Accordingly, in the driver assistance system and the like of the disclosure, it is possible to avoid collision between the vehicle as the target of the driver assistance, e.g., the subject vehicle, and the vehicle of which movement is difficult to detect, e.g., the vehicle devoid of the road-to-vehicle communication function and the like. Hence, it is possible to provide safer driver assistance.

It is to be noted that the "installation spot" is preferably a spot at which multiple roads cross, e.g., an intersection spot, but it suffices that the "installation spot" is a spot to be passed in an area by each vehicle including the subject vehicle, e.g., a spot on a single road.

The "observation sensor" means an imaging camera that captures an image of a vehicle passing the installation spot. However, the observation sensor may be LiDAR, a radar sensor, an ultrasonic camera, and any other device configured to recognize objects and fixed at a predetermined position.

The "first installation spot" means a spot where each observation sensors is installed in the predetermined area. The "second installation spot" means spots of multiple installation spots with respect to each first installation spot. However, it is preferable that the second installation spot is all the other spots different from the corresponding first installation spot.

The "frequency information" is information indicating a probability (ratio) of the vehicles passing each of the second installation spots, out of the vehicles that have passed the first installation spot.

The "information acquisition processing" includes not only acquiring the frequency information transmitted from outside through a network or the like, but also a case where the frequency information is read from storage means provided inside the driver assistance system, e.g., a memory.

The "acquired installation spot combination" includes not only a combination of the first installation spot and the single second installation spot, but also a combination including the two or more different second installation spots. In particular, as for the combinations including the two or more different second installation spots, when the order in which the vehicle passes the second installation spots is different, it is preferable that the combinations are regarded as different combinations.

The "random vehicle devoid of the road-to-vehicle communication function" means, for example, a vehicle that does not have the road-to-vehicle communication function to make data exchange with the observation sensor, and of which a planned travel route in the predetermined area is therefore ungraspable.

(2) Moreover, the embodiment of the disclosure has a configuration in which the processors carry out collection processing of collecting, as vehicle detection information, information detected by the observation sensors and related to the passing vehicles that have passed respective ones of the installation spots, and carry out, as the information acquisition processing, calculation processing of calculating the frequency for each combination of the installation spots, based on the vehicle detection information regarding each of the passing vehicles.

With this configuration, in the driver assistance system and the like of the disclosure, it is possible to use actual data regarding the passing vehicles in the relevant area. Hence, it is possible to precisely predict the route of the vehicle devoid of the road-to-vehicle communication function and the like.

Accordingly, in the driver assistance system and the like of the disclosure, it is possible to use data based on actual states in prediction of collision between the subject vehicle and the vehicle devoid of the road-to-vehicle communication function and the like. Hence, it is possible to make prediction with high certainty, resulting in safer driver assistance.

It is to be noted that the "vehicle detection information" includes, for example, information regarding the vehicle such as attributes (a registration number, a vehicle model, a type, a color, or a manufacturer), a direction of movement, and a moving speed of the vehicle that has passed each installation spot. The information regarding the vehicle includes a position and a direction of photographing of the observation sensor.

(3) Moreover, the embodiment of the disclosure has a configuration in which the processors acquire subject-vehicle travel information and travel route information, the subject-vehicle travel information indicating information regarding a position of the subject vehicle and the planned travel route of the relevant subject vehicle in the predetermined area, and the travel route information indicating information regarding travel routes of the passing vehicles including the first installation spot and the second installation spot, and as the estimation processing, identify intersection spots at which the planned travel route and the travel routes cross, based on the subject-vehicle travel information and the travel route information, estimate arrival time of the subject vehicle at each of the intersection spots, based on the subject-vehicle travel information, when the random vehicle different from the subject vehicle is detected by any one of the observation sensors installed on the travel routes, acquire vehicle detection information regarding the vehicle detected by the relevant one of the observation sensors, estimate arrival time of the random vehicle at each of the intersection spots, based on the vehicle detection information and the frequency information, calculate a time difference between the planned arrival time of the subject vehicle at the intersection spot and the planned arrival time of the random vehicle, and estimate the possibility of collision between the subject vehicle and the random vehicle, based on information regarding the calculated time difference.

With this configuration, in the driver assistance system and the like of the disclosure, for example, based on the frequency information, it is possible to calculate a probability of a case where the vehicle devoid of the road-to-vehicle communication function and the like travels along each estimated route, and estimate the possibility of collision with the subject vehicle. Hence, it is possible to make the prediction with high certainty with respect to the collision with the vehicle devoid of the road-to-vehicle communication function and the like.

(4) Moreover, the embodiment of the disclosure has a configuration in which the processors carry out notification processing of notifying the subject vehicle of the possibility of collision with the random vehicle.

With this configuration, in the driver assistance system and the like of the disclosure, it is possible to alert the attention of the driver of the subject vehicle by, for example, the sense of sight or the sense of hearing, with respect to the collision with the vehicle devoid of the road-to-vehicle communication function and the like, and provide driver assistance in accompaniment therewith.

Accordingly, in the driver assistance system and the like of the disclosure, even when the possibility of collision is high, it is possible to precisely avoid the collision. Hence, it is possible to raise safety awareness of the driver.

It is to be noted that the "notification processing" may be a process of giving a notification of the possibility of collision to give an alarm to the driver, or alternatively, may be a process of giving a notification of the possibility of collision to allow the vehicle to carry out an automated driving control.

(5) Moreover, the embodiment of the disclosure has a configuration in which the processors carry out parking and stopping information acquisition processing of acquiring, as parked and stopped position information, information regarding a parked and stopped position of a specific vehicle in the predetermined area, out of the passing vehicles, and when a random vehicle different from the subject vehicle is detected by any one of the observation sensors installed on the travel routes, carry out determination processing of determining whether or not the random vehicle is the specific vehicle, based on the acquired parked and stopped position information, to estimate possibility of collision between the subject vehicle and the specific vehicle based on a result of the determination processing.

With this configuration, in the driver assistance system and the like of the disclosure, it is possible to precisely predict the movement of the undetectable vehicle, inclusive of a parking state in the area.

In other words, in the driver assistance system and the like of the disclosure, it is possible to estimate the collision between the relevant vehicle and the vehicle as the target of the driver assistance, inclusive of parking and stopping of the vehicle of which the movement is difficult to detect.

(6) Moreover, the embodiment of the disclosure has a configuration in which the processors, as the estimation processing, when the random vehicle is the specific vehicle, identify a route of the specific vehicle based on the parked or stopped position in a corresponding piece of the parked and stopped position information, and estimate the possibility of collision between the subject vehicle and the specific vehicle based on the identified route.

With this configuration, in the driver assistance system and the like of the disclosure, it is possible to estimate the collision between the relevant vehicle and the vehicle as the target of the driver assistance, inclusive of the parking and the stopping of the vehicle of which the movement is difficult to detect.

(B) Details of Embodiments of the Disclosure

In the following, some preferred embodiments of the disclosure are described in detail with reference to the accompanying drawings. It is to be noted that throughout the present description and the drawings, elements having substantially the same function and configuration are denoted with the same reference numerals to avoid any redundant description.

(B.1) First Embodiment (B1.1) Overview of Driver Assistance Network System

First, with reference to FIG. 1, description is made of an overview of a driver assistance network system S1 of a first embodiment.

It is to be noted that FIG. 1 is a system configuration diagram illustrating a configuration of the driver assistance network system S1 of this embodiment.

As illustrated in FIG. 1, the driver assistance network system S1 of this embodiment includes a driver assistance control system 10 and a management server 20. The driver assistance control system 10 is mounted on each driver assistance target vehicle M1, and performs various kinds of controls related to driver assistance. The management server 20 provides information for driver assistance to the driver assistance target vehicle M1.

Moreover, the driver assistance network system S1 of this embodiment includes multiple observation sensor systems (hereinafter, referred to as "observation systems") 30 that are installed on roads, for example, at intersection spots and observe movement of each vehicle.

In particular, the driver assistance network system S1 is configured to predict movement of a vehicle (hereinafter, referred to as a "movement prediction target vehicle") 2, in cooperation with the observation systems 30. The vehicle 2 is a vehicle devoid of a road-to-vehicle communication function and a vehicle-to-vehicle communication function, and of which movement such as a current position or a route are to be predicted.

Moreover, the driver assistance network system S1 of this embodiment is configured to allow the driver assistance control system 10 and the management server 20 to cooperate with each other, to carry out driver assistance control processing. The driver assistance control processing includes providing driver assistance to avoid collision between the driver assistance target vehicle M1 and the movement prediction target vehicle M2.

That is, the driver assistance network system S1 is configured to predict the movement of the movement prediction target vehicle M2 of which movement on the roads is difficult to detect, based on the information detected by each of the observation systems 30, to provide the driver assistance target vehicle M1 with driver assistance.

It is to be noted that, in this embodiment, description is given assuming that the management server 20 constitutes the driver assistance system described above.

The driver assistance control system 10 is a system mounted on at least the driver assistance target vehicle M1, and a system that establishes wireless and wired communication lines with the management server 20 through a network N and a base station BS and is coupled to the management server 20, and carries out transmission and receipt of various kinds of data.

In particular, the driver assistance control system 10 of this embodiment is configured to carry out the driver assistance control processing based on information for driver assistance (hereinafter, referred to as "driver assistance information") to the driver assistance target vehicle M1. The driver assistance information is provided by the management server 20.

Moreover, separately from the driver assistance control processing described above, the driver assistance control system 10 of this embodiment is configured to directly transmit and receive surrounding environment data to and from each of the observation systems 30 by road-to-vehicle communication, and provide the driver assistance target vehicle (subject vehicle) 1 with driver assistance based on the received surrounding environment data.

Furthermore, similarly, the driver assistance control system 10 of this embodiment is configured to directly transmit and receive the surrounding environment data to and from a random vehicle including the driver assistance control system 10 by vehicle-to-vehicle communication, and provide the driver assistance target vehicle (subject vehicle) 1 with driver assistance based on the relevant surrounding environment data.

The management server 20 is a device communicatably coupled, through the network N, to the driver assistance control system 10 and each of the observation systems 30 by cloud computing technology. The driver assistance control system 10 is mounted on the driver assistance target vehicle (subject vehicle) 1, In particular, the management server 20 includes one or more processors such as CPUs, and is configured to realize driver assistance information provision processing by the one or more processors such as the CPUs executing a computer program.

Specifically, the management server 20 is configured to acquire, from each of the observation systems 30, information regarding each vehicle that has passed a spot where the relevant one of the observation systems 30 is installed (hereinafter, referred to as an "installation spot").

Moreover, the management server 20 is configured to predict the movement of the movement prediction target vehicle M2 by using a statistical calculation method. The movement prediction target vehicle M2 is difficult to grasp, for example, the current position on the road, the route, and the speed.

In particular, the management server 20 is configured to carry out collision possibility estimation processing, based on a result of processing of predicting the movement of the movement prediction target vehicle M2. The collision possibility estimation processing includes estimating possibility of collision between the driver assistance target vehicle M1 and the movement prediction target vehicle M2.

Moreover, the management server 20 is configured to provide the relevant driver assistance target vehicle M1 with a result of the collision possibility estimation processing as the driver assistance information.

That is, the management server 20 of this embodiment is configured to carry out processing of providing the driver assistance target vehicle M1 with the driver assistance information (hereinafter, referred to as the "driver assistance information provision processing").

It is to be noted that a part or all of the management server 20 may include an updatable one such as firmware, or may be a program module or the like to be executed by a command from a CPU or the like.

The computer program may be held in a recording medium that serves as a storage (memory) 240 provided in the management server 20, or may be held in a recording medium built in the management server 20 or any recording medium externally attachable to the management server 20.

Moreover, the management server 20 includes various kinds of databases (in a broad sense, a storage device or a memory) that holds various kinds of information to be used in assisting each driver in driving, inclusive of the collision possibility estimation processing.

Furthermore, the management server 20 of this embodiment may access a database (in a broad sense, a storage device or a memory) coupled through the network N, or another server device (unillustrated) that manages, for example, a database (in a broad sense, a storage device or a memory).

The observation system 30 is disposed at a predetermined spot on a road (i.e., the installation spot), e.g., an intersection spot. The observation system 30 is coupled to the management server 20 through the network N such as the Internet and the base station BS, while directly communicating with each driver assistance target vehicle M1 by short-range radio or the like.

For example, it is preferable that the observation system 30 is disposed at the installation spot such as a spot where multiple roads cross, e.g., an intersection spot. However, the observation system 30 may be disposed at a spot to be passed in an area by each vehicle, e.g., a spot on a single road.

Moreover, each of the observation systems 30 includes, for example, an imaging camera function, and carries out moving object recognition processing. The moving object recognition processing includes capturing a predetermined imaging range at each predetermined timing to generate image data, and performing image processing on the captured image to recognize a moving object such as a vehicle and a pedestrian. For example, each of the observation systems 30 generates the image data at every 30 frame rates as the predetermined timing.

Moreover, upon detecting a moving object such as a vehicle or a pedestrian, each of the observation system 30 calculates a direction of movement and a moving speed of the moving object based on a temporal change in a position of the detected moving object by using predetermined calculation.

In particular, each of the observation systems 30 transmits attributes of the moving object including the detected vehicle, the direction of movement and the moving speed of each moving object, and a position and a direction of photographing of the relevant one of the observation systems 30 on the map data, as moving object detection information to the driver assistance control system 10. The attributes of the moving object includes the kind and the registration number of the moving object.

In addition, within the moving object detection information, each of the observation systems 30 transmits, to the management server 20, information regarding a vehicle (hereinafter, referred to as "vehicle detection information") as reference information. The vehicle detection information includes, for example, the attributes, the direction of movement, and the moving speed, inclusive of the position and the direction of photographing of the relevant one of the observation systems 30 on the map data.

Furthermore, in this embodiment, description is given by using the imaging camera as the observation system 30. However, this is non-limiting. The observation system 30 may include any sensor configured to recognize an object (i.e., a moving object) such as LiDAR, a radar sensor, or an ultrasonic camera.

It is to be noted that FIG. 1 illustrates an example of the driver assistance network system S1 that provides driver assistance to a vehicle as a target of driver assistance (hereinafter, referred to as the "driver assistance target vehicle") M1.

In particular, FIG. 1 illustrates only some of the driver assistance target vehicles M1, the movement prediction target vehicles M2, and the observation systems 30, to prevent complicatedness of the figure.

That is, in the actual driver assistance network system S1, more driver assistance target vehicles M1, more movement prediction target vehicles M2 (hereinafter collectively referred to as "vehicles"), and more observation systems 30 than illustrated in FIG. 1 are present.

Moreover, in this embodiment, there is no particular limitation on each vehicle as long as each vehicle is a four-wheeled automobile, a motorcycle, or other vehicles configured to be driven by a driver, and is an object configured to move at a predetermined moving speed.

(B1.2) Driver Assistance Target Vehicle

First, with reference to FIG. 2, the driver assistance target vehicle M1 of this embodiment is described. It is to be noted that FIG. 2 is a schematic diagram illustrating a configuration example of the driver assistance target vehicle M1 of this embodiment.

(Driver Assistance Target Vehicle)

As illustrated in FIG. 2, the driver assistance target vehicle M1 includes a driving force source 9 that generates driving torque of the driver assistance target vehicle M1, and is configured to transmit the driving torque outputted from the driving force source 9 to wheels 3.

In particular, the driver assistance target vehicle M1 is configured as a four-wheel drive vehicle that transmits the driving torque to a left front wheel 3LF, a right front wheel 3RF, a left rear wheel 3LR, and a right rear wheel 3RR.

The driving force source 9 may be an internal combustion engine such as a gasoline engine or a diesel engine, or may be a driving motor, or may include both an internal combustion engine and a driving motor.

Moreover, the driver assistance target vehicle M1 may be, for example, an electric vehicle including two driving motors, i.e., a front wheel driving motor and a rear wheel driving motor. Alternatively, the driver assistance target vehicle M1 may be an electric vehicle including driving motors corresponding to the respective wheels 3.

It is to be noted that when the driver assistance target vehicle M1 is an electric vehicle or a hybrid electric vehicle, the driver assistance target vehicle M1 includes a secondary battery and a generator such as a motor or a fuel cell. The secondary battery accumulates electric power to be supplied to a driving motor. The generator generates electric power to be charged in the battery.

The driver assistance target vehicle M1 includes the driving force source 9, an electric steering device 15, and brake devices 17LF, 17RF, 17LR, and 17RR (hereinafter, collectively referred to as "brake devices 17" when distinction is not particularly necessary) as devices to be used for a driving control of the vehicle.

The driving force source 9 outputs the driving torque to be transmitted to a front wheel drive shaft 5F and a rear wheel drive shaft 5R through an unillustrated transmission, a front wheel differential mechanism 7F, and a rear wheel differential mechanism 7R.

Moreover, driving of the driving force source 9 and the transmission is controlled by a vehicle driving controller 40 including one or more electronic control units (ECU: Electronic Control Unit).

The electric steering device 15 is provided on the front wheel drive shaft 5F. The electric steering device 15 includes an unillustrated electric motor and an unillustrated gear mechanism. The electric steering device 15 is controlled by the vehicle driving controller 40 to adjust steering angles of the left front wheel 3LF and the right front wheel 3RF.

In manual driving, the vehicle driving controller 40 controls the electric steering device 15 based on a steering wheel angle of a steering wheel 13 by the driver. Moreover, in an automated driving control, the vehicle driving controller 40 controls the electric steering device 15 based on a set track.

The brake devices 17LF, 17RF, 17LR, and 17RR apply braking forces respectively to the left front wheel 3LF, the right front wheel 3RF, the left rear wheel 3LR, and the right rear wheel 3RR.

Moreover, the brake devices 17 each include, for example, a hydraulic brake device. Hydraulic pressure to be supplied to each of the brake devices 17 is controlled by the vehicle driving controller 40 to generate a predetermined braking force.

It is to be noted that when the driver assistance target vehicle M1 is an electric vehicle or a hybrid electric vehicle, the brake devices 17 are used in combination with a regenerative brake by a driving motor.

The vehicle driving controller 40 includes one or more electronic control units that control the driving of the driving force source 9, the electric steering device 15, and the brake devices 17, and has a function of controlling the driving of the transmission. The transmission performs, as necessary, shifting of an output outputted from the driving force source 9 and transmits the resultant output to the wheels 3.

The vehicle driving controller 40 is configured to acquire information transmitted from the driver assistance control system 10, and is configured to carry out the automated driving control of the driver assistance target vehicle M1.

(Driver Assistance Control System)

The driver assistance control system 10 is a system that allows the driver assistance target vehicle M1 to automatically travel in an automated driving mode, or provides driver assistance in a manual driving mode, to assist a driver in driving the driver assistance target vehicle M1 while the driver is driving the driver assistance target vehicle M1.

Moreover, the driver assistance control system 10 is configured to serve as a device that assists in driving the driver assistance target vehicle M1 by one or more processors such as CPUs executing a computer program, to realize various kinds of processing described later.

In particular, the driver assistance control system 10 of this embodiment carries out the driver assistance control processing, based on the information regarding the driver assistance to the subject vehicle (hereinafter, referred to as the "driver assistance information") transmitted from the management server 20. The driver assistance control processing includes providing driver assistance such as an alarm process for the driver or the automated driving control.

It is to be noted that the driver assistance control system 10 of this embodiment is not limited to a device mounted on the driver assistance target vehicle M1, but may be an information terminal device configured to cooperate with the driver assistance target vehicle M1 and configured to communicate with the management server 20, e.g., a smartphone or a wearable device.

Moreover, the driver assistance control system 10 is coupled to a vehicle operation/behavior sensor 35 and a vehicle outside camera 31 directly or through communication means such as the CAN (Controller Area Network) or the LIN (Local Inter Net). The vehicle outside camera 31 constitutes a surrounding environment sensor.

Furthermore, the driver assistance control system 10 is coupled to a map data storage 33, a GNSS (Global Navigation Satellite System) antenna 37, the vehicle driving controller 40, and an HMI (Human Machine Interface) 43 through the communication means.

It is to be noted that, in the driver assistance target vehicle M1, the vehicle operation/behavior sensor 35, the GNSS antenna 37, the map data storage 33, the HMI 43, and the vehicle driving controller 40 are each directly coupled to the driver assistance control system 10. However, these may be indirectly coupled to the driver assistance control system 10 through the communication means such as the CAN or the LIN.

Moreover, details of the configuration and functions of the driver assistance control system 10 in this embodiment are described later.

(Surrounding Environment Sensor)

The surrounding environment sensor is the vehicle outside camera 31 that acquires information regarding surrounding environment of the driver assistance target vehicle M1, and includes a front photographing cameras 31LF and 31RF and a rear photographing camera 31R.

In particular, the front photographing cameras 31LF and 31RF, and the rear photographing camera 31R include an imaging device such as CCD (Charged-Coupled Devices) or CMOS (Complementary Metal-Oxide-Semiconductor).

Moreover, the front photographing cameras 31LF and 31RF, and the rear photographing camera 31R capture a forward view or a rearward view of the driver assistance target vehicle M1, generate image data, and provide the generated image data to the driver assistance control system 10.

It is to be noted that the front photographing cameras 31LF and 31RF constitute a stereo camera including a pair of left and right cameras, and the rear photographing camera 31R constitutes a so-called monocular camera. However, they may each be either a stereo camera or a monocular camera.

Moreover, instead of or in addition to the front photographing cameras 31LF and 31RF, and the rear photographing camera 31R, for example, a camera provided on side mirrors 11L and 11R may be provided. The camera photographs a left rearward view or a right rearward view.

Furthermore, as the surrounding environment sensor of this embodiment, any one or more of LiDAR (Light Detection And Ranging), a radar sensor such as millimeter-wave radar, and an ultrasonic sensor may be provided.

(Vehicle Operation/Behavior Sensor)

The vehicle operation/behavior sensor 35 includes a driving mode changeover switch. The vehicle operation/behavior sensor 35 detects setting information regarding the automated driving mode or the manual driving mode in which driver assistance is provided, and transmits a sensor signal including the detected information to the driver assistance control system 10.

Moreover, the vehicle operation/behavior sensor 35 includes at least one sensor that detects an operation state and behavior of the vehicle.

For example, the vehicle operation/behavior sensor 35 includes at least one of a vehicle speed sensor, an acceleration rate sensor, and an angular velocity sensor, and detects information regarding the behavior of the vehicle such as a vehicle speed, a longitudinal acceleration rate, a lateral acceleration rate, and a yaw rate.

Furthermore, for example, the vehicle operation/behavior sensor 35 includes at least one of an accelerator position sensor, a brake stroke sensor, a brake pressure sensor, a steering angle sensor, an engine speed sensor, a brake lamp switch, and a turn signal lamp switch.

In addition, the vehicle operation/behavior sensor 35 detects information regarding the operation state of the vehicle such as the steering wheel angle of the steering wheel or a steering angle of steered wheels, accelerator opening, an amount of a brake operation, an on/off state of the brake lamp switch, and an on/off state of the turn signal lamp switch.

(GNSS Antenna)

The GNSS antenna 37 receives satellite signals from satellites such as GPS (Global Positioning System) satellites, and transmits positional information regarding the driver assistance target vehicle M1 on the map data to the driver assistance control system 10. The positional information is included in the received satellite signals.

It is to be noted that, instead of the GNSS antenna 37, an antenna may be provided that receives satellite signals from other satellite systems that identify the position of the vehicle.

(Map Data Storage)

The map data storage 33 includes a storage element, or a storage device such as a magnetic disk, an optical disk, or a flash memory, and is a storage medium that holds map data.

For example, as the storage element, a RAM (Random Access Memory) or a ROM (Read Only Memory) is used. As the magnetic disk, an HDD (Hard Disk Drive) or the like is used. As the optical disk, a CD (Compact Disc) or a DVD (Digital Versatile Disc) is used. As the flash memory, an SSD (Solid State Drive) or a USB (Universal Serial Bus) memory is used.

It is to be noted that the map data storage 33 of this embodiment may be a storage medium that holds map data in a navigational system (unillustrated) that assists a driver in driving and guides the driver assistance target vehicle M1 to a predetermined destination.

(HMI)

The HMI 43 is driven by the driver assistance control system 10, and has a function of notifying the driver of various kinds of information by means of, for example, image display or audio output, e.g., an unillustrated display device and an unillustrated speaker provided in an instrument panel.

It is to be noted that the display device may be a display device of the navigation system, or may be an HUD (head-up display) that provides display on a front windshield in superimposition on a landscape around the vehicle.

(Vehicle Driving Controller)

The vehicle driving controller 40 includes at least one control system that controls driving of the driver assistance target vehicle M1.

The vehicle driving controller 40 includes an engine control system or a motor control system, an electric steering system, or a brake system. The engine control system or the motor control system controls a driving force of the vehicle. The electric steering system controls the steering wheel angle of the steering wheel or the steering angle of the steered wheels. The brake system controls the braking force of the vehicle.

It is to be noted that the vehicle driving controller 40 may include a transmission system. The transmission system performs shifting of an output outputted from the engine or the driving motor, and transmits the resultant output to driving wheels.

Moreover, when a driving condition is set by the driver assistance control system 10 during the automated driving mode, the vehicle driving controller 40 carries out a control for driver assistance in the automated driving based on the set driving condition.

Specifically, the vehicle driving controller 40 controls the engine control system or the motor control system, the electric steering system, or the brake system based on the set driving condition. The electric steering system controls the steering wheel angle of the steering wheel, or the steering angle of the steering wheels. The brake system controls the braking force of the vehicle.

(B1.3) Driver Assistance Control System

First, with reference to FIG. 3, description is given of details of the driver assistance control system 10 to be mounted on the driver assistance target vehicle M1 of this embodiment.

It is to be noted that FIG. 3 is an example of a system configuration diagram illustrating a configuration of the driver assistance control system 10 mounted on the driver assistance target vehicle M1 of this embodiment.

As illustrated in FIG. 3, the driver assistance control system 10 includes a processor 110, an operation input unit 120, a storage 140, an information storage medium 150, and a communication unit 170. However, the driver assistance control system 10 may have a configuration in which some of these are omitted. A part or all of the driver assistance control system 10 may include an updatable one such as firmware, or may be a program module or the like to be executed by a command from a CPU or the like.

The processor 110 drives hardware such as various processors (CPU, DSP, and the like) based on an application program (hereinafter, also referred to as an "application") held in the information storage medium 150 to carry out each process of this embodiment.

It is to be noted that any kind of the application program may be held in the information storage medium 150. Moreover, the processor 110 of this embodiment may read a program or data held in the information storage medium 150, temporarily store the read program or data in the storage 140, and perform each process based on the program or the data.

Furthermore, the processor 110 carries out various kinds of processing by using a main storage in the storage 140 as a work area, or realizes the processing by the application program.

Specifically, the processor 110 includes a communication controller 111, an operation acceptance processor 112, a driver assistance control processor 113, and a travel-related information providing unit 114. However, the processor 110 may have a configuration in which some of these are omitted.

The communication controller 111 controls the communication unit 170, establishes a communication line with the management server 20 through a network such as a mobile communication network and the Internet, and carries out transmission and receipt of data (predetermined digitized information).

Moreover, the communication controller 111 controls the communication unit 170 to establish a communication line with a random driver assistance vehicle M1 and a device outside the driver assistance target vehicle, by V2X communication such as vehicle-to-vehicle communication or road-to-vehicle communication, and carries out the transmission and the receipt of data. The device outside the driver assistance target vehicle includes the observation systems 30.

The operation acceptance processor 112 recognizes input information inputted from the operation input unit 120 by the driver, and outputs the recognized information to the driver assistance control processor 113.

During the automated driving control, the driver assistance control processor 113 sets the route, the vehicle speed, and the like based on information from the unillustrated surrounding environment sensor (vehicle outside camera 31), and positional information regarding the subject vehicle or detection information regarding each moving object. The detection information regarding each moving object is provided from the observation systems 30.

Thus, the driver assistance control processor 113 transmits, to the vehicle driving controller 40, a control command to control the set route, the vehicle speed, and the like.

Moreover, during the driver assistance control while the driver is driving the vehicle, similarly, the driver assistance control processor 113 provides the HMI 43 with predetermined data, based on the information and the like from the surrounding environment sensor, to provide the driver with alarm display of, for example, collision prediction.

Furthermore, the driver assistance control processor 113 determines the contents of the driver assistance to allow the driver to enjoy the corresponding driver assistance, based on the driver assistance information transmitted from the management server 20. Based on the contents of the driver assistance determined, the driver assistance control processor 113 carries out various kinds of the driver assistance control processing.

In particular, when collision between the subject vehicle as the driver assistance target vehicle M1 and the movement prediction target vehicle M2 is predicted, the driver assistance control processor 113 receives information regarding the relevant collision (hereinafter, referred to as "collision prediction information"), as the driver assistance information transmitted from the management server 20.

Moreover, based on the received collision prediction information, the driver assistance control processor 113 transmits, to the vehicle driving controller 40 or the HMI 43, a control command (a control command of the driver assistance control processing) in carrying out the alarm process or a vehicle driving control related to the automated driving or the assistance with the driver in driving the vehicle.

The travel-related information providing unit 114 provides the management server 20 with the current position of the subject vehicle and the travel route to the destination (inclusive of a waypoint) set to carry out the driver assistance control processing, as travel route information.

It is to be noted that the travel-related information providing unit 114 may provide the management server 20 with a route (hereinafter, referred to as a "planned travel route") on which the vehicle is planned to travel from the current position of the relevant driver assistance target vehicle M1 at timing of a request for the driver assistance, as the travel route information.

Moreover, the travel route information includes, for example, the moving speed of the relevant driver assistance target vehicle M1, a traffic condition on the current planned travel route, and planned time identification information. The planned time identification information identifies the planned passing time at any spot of the driver assistance target vehicle M1, e.g., the passing time through main spots on the travel route.

The operation input unit 120 is a device to be used when given information is inputted by the driver. The operation input unit 120 is configured to output information inputted by the driver (hereinafter, referred to as "input information") to the processor 110.

For example, the operation input unit 120 includes, for example, a lever, a button, a dial operation device, a microphone, a touchscreen display, a keyboard, a mouse, and a camera that accepts an input by a gesture.

Moreover, the operation input unit 120 includes a detector (unillustrated) that detects the input information (input signal) by the driver.

In particular, when the operation input unit 120 includes a microphone, the detector constitutes a voice recognition device that accepts an input by a voice of an occupant such as the driver. Moreover, when the operation input unit 120 includes a camera, the detector constitutes an image recognition device that accepts an input by a gesture captured by the camera.

Furthermore, the operation input unit 120 accepts, as the input information, an input of the destination of the subject vehicle or an input of the relevant destination and the waypoint, and a command input to identify the route to the destination.

The storage 140 serves as a work area for the processor 110 and the like, and its function is realized by hardware such as a RAM (VRAM).

The storage 140 of this embodiment includes a main storage 141 and a data storage 142. The main storage 141 is used as the work area. The data storage 142 holds, for example, a computer program to be used when carrying out each process, and table data. However, the storage 140 may have a configuration in which some of these are omitted.

The information storage medium 150 is computer-readable. The information storage medium 150 may hold various kinds of data including an ID corresponding to each of the driver assistance control systems 10, in addition to various kinds of the application programs and an OS (operating system).

That is, the information storage medium 150 holds, for example, the application program—that causes a computer to serve as each unit of this embodiment (the application program that causes a computer to carry out the processing of each unit), and the ID to establish communication with each of the driver assistance control systems 10.

For example, the information storage medium 150 includes a storage element, or a storage device such as a magnetic disk, an optical disk, or a flash memory.

(B1.4) Management Server

Description is given next, with reference to FIG. 4, of an example of a configuration of the management server 20 of this embodiment. It is to be noted that FIG. 4 is a block diagram illustrating an example of the configuration of the management server 20 according to this embodiment.

As illustrated in FIG. 4, the management server 20 includes a processor 210, the storage 240, an information storage medium 250, and a communication unit 270. It is to be noted that the management server 20 may have a configuration in which some of these are omitted.

The processor 210 includes a communication controller 211, a data obtainer 212, a data analyzer 213, a collision estimation processor 214, a driver assistance information providing unit 218, and a timer manager 219. It is to be noted that the processor 210 may have a configuration in which some of these are omitted.

The communication controller 211 performs processing of transmitting and receiving data to and from each of the driver assistance control systems 10 or each of the observation systems 30 through the network N in cooperation with the communication unit 270.

In particular, to provide the driver assistance target vehicle M1 with the driver assistance, the communication controller 211 receives the data transmitted from each of the driver assistance control systems 10 or each of the observation systems 30.

Moreover, the communication controller 211 transmits various kinds of data, such as a calculation result calculated based on the received data, to each of the driver assistance control systems 10.

The data obtainer 212 carries out processing of collecting information (i.e., reference information) regarding, for example, the attributes, the direction of movement, and the moving speed of each vehicle transmitted from each of the observation systems 30 (hereinafter, referred to as "reference information collection processing").

Moreover, when the route to the destination or the route being traveled has been set in each of the driver assistance target vehicles M1, the data obtainer 212 acquires the travel route information that defines the current position and the travel route of the relevant driver assistance target vehicle M1, from the relevant driver assistance target vehicle M1.

It is to be noted that the data obtainer 212 acquires the travel route information at predetermined timing, e.g., when the command input to identify the destination or the route being traveled is accepted in each of the driver assistance target vehicles M1 based on a command by the driver.

The data analyzer 213 carries out given calculation processing based on the collected reference information, and performs frequency information acquisition processing. The frequency information acquisition processing includes acquiring, as frequency information, frequency with respect to each vehicle at which a passing vehicle that has passed a first installation spot at the observation system 30 passes a second installation spot.

Moreover, the data analyzer 213 carries out predetermined calculation based on the acquired frequency information, and performs vehicle movement prediction processing. The vehicle movement prediction processing includes calculating each piece of the reference information (a frequency described later) that identifies the movement of the movement prediction target vehicle M2 devoid of the road-to-vehicle communication function and the vehicle-to-vehicle communication function.

The collision estimation processor 214 estimates the possibility of collision between the driver assistance target vehicle M1 and the movement prediction target vehicle M2 on the route of the driver assistance target vehicle M1, based on the reference information calculated by the data analyzer 213 and the travel route information regarding the movement prediction target vehicle M2.

In particular, the collision estimation processor 214 predicts the movement of the movement prediction target vehicle M2, and performs the collision possibility estimation processing. The collision possibility estimation processing includes estimating the possibility of collision with the movement prediction target vehicle M2.

The driver assistance information providing unit 218 provides the driver assistance control system 10 with various kinds of information related to driver assistance through the communication unit 270 under the control of the communication controller 211.

In particular, when estimating, by the collision possibility estimation processing, presence of the possibility of collision between the driver assistance target vehicle M1 and the movement prediction target vehicle M2, the driver assistance information providing unit 218 of this embodiment provides the driver assistance control system 10 of the relevant driver assistance target vehicle M1 with a result of the estimation as information.

The timer manager 219 has a function of making measurement starting at the current date and time or starting at predetermined timing. When predetermined timing arrives or when a predetermined request is received, the timer manager 219 outputs the current time or a measurement result.

The storage 240 serves as a work area for the processor 210 and the like, and its function is realized by hardware such as a RAM (VRAM).

In particular, the storage 240 includes a main storage 241 as a work area, a data storage 242, a frequency information storage 243, and a vehicle detection information storage 244. The data storage 242 holds data to be used in each process. The frequency information storage 243 holds the frequency information. The vehicle detection information storage 244 holds the collected vehicle detection information. However, the storage 240 of this embodiment may have a configuration in which some of these are omitted.

Specifically, the data storage 242 holds a computer program to carry out each process, table data, and data serving as a reference for each process.

The data storage 242 holds, for each target area, information (hereinafter, referred to as "spot combination route information") that defines, for each first installation spot, a route of a combination of the relevant first installation spot and one or more second installation spots (hereinafter, referred to as "spot combination route").

The frequency information storage 243 holds the frequency of each combination with each second installation spot for each first installation spot, and information regarding the frequency (hereinafter, referred to as the "frequency information").

The vehicle detection information storage 244 holds the vehicle detection information detected by each of the observation systems 30, for each of the observation system 30 (that is, for each first installation spot).

The information storage medium 250 is computer-readable. The information storage medium 250 may hold various kinds of data including an ID corresponding to each of the driver assistance control systems 10, in addition to various kinds of the application programs and an OS (operating system).

That is, the information storage medium 250 holds, for example, the application program that causes a computer to serve as each unit of this embodiment (the application program that causes a computer to carry out processing of each unit), and the ID to establish communication with each of the driver assistance control systems 10.

For example, the information storage medium 250 includes a storage element, or a storage device such as a magnetic disk, an optical disk, or a flash memory.

The communication unit 270 performs various kinds of controls to establish communication with the outside (for example, with each of the driver assistance control systems 10). Its functions are constituted by hardware such as various processors or a communication ASIC, computer programs, and the like.

(B1.5) Observation System

Description is given next, with reference to FIG. 5, of the observation system 30 of this embodiment. It is to be noted that FIG. 5 is a diagram illustrating an example of a configuration of the observation system 30 of this embodiment.

As illustrated in FIG. 5, the observation system 30 includes an imaging camera 310 and a sensor management device 320. The imaging camera 310 captures the predetermined imaging range and generates the image data. The sensor management device 320 carries out, for example, the predetermined image processing on the captured image, and communication control processing with the vehicle.

The imaging camera 310 includes, for example, an imaging device such as the CCD or the CMOS. The imaging camera 310 captures the predetermined imaging range at each predetermined timing to generate the image data.

The sensor management device 320 includes one or more processors such as a CPU or an MPU (Micro Processing Unit).

Moreover, a part or all of the sensor management device 320 may include an updatable one such as firmware, or may be a program module or the like to be executed by a command from a CPU or the like.

Furthermore, the sensor management device 320 executes a computer program to carry out an operation control of the imaging camera 310, perform the image processing on the image data captured by the imaging camera 310, and carry out a communication control with the management server 20 or the driver assistance target vehicle M1.

Specifically, as illustrated in FIG. 5, the sensor management device 320 includes a sensor communication unit 321, a sensor processor 322, and a sensor storage 323. It is to be noted that the sensor management device 320 may have a configuration in which some of these are omitted.

The sensor communication unit 321 performs various kinds of controls to establish communication with the management server 20 or the driver assistance target vehicle M1. The sensor communication unit 321 is an interface to perform data communication with the management server 20 through the network N, or directly with the driver assistance target vehicle M1.

In particular, the sensor communication unit 321 includes, for example, hardware such as various processors or a communication ASIC, or computer programs, and establishes various kinds of communication under the control of the sensor processor 322.

The sensor processor 322 reads and executes an application program held in the sensor storage 323 to carry out various kinds of processing such as the operation control of the imaging camera 310.

Moreover, the sensor processor 322 performs various kinds of processing by using a portion of the sensor storage 323 as a work area. Moreover, the function of the sensor processor 322 is realized by hardware such as various processors (CPU, DSP, and the like) or the application program.

Specifically, the sensor processor 322 includes a communication controller 325, a camera controller 326, an image processor 327, and a timer manager 329. It is to be noted that the sensor processor 322 may have a configuration in which some of these are omitted.

The communication controller 325 controls the sensor communication unit 321 to establish a network line with the management server 20, or is coupled to the driver assistance target vehicle M1 by road-to-vehicle communication, to perform processing to transmit and receive various kinds of data.

In particular, the communication controller 325 is coupled to the management server 20 through the network N, or directly coupled to the driver assistance target vehicle M1, to transmit each piece of information detected by the image processing to the management server 20 or the driver assistance target vehicle M1.

The camera controller 326 carries out, at each timing set in advance, the operation control to allow the imaging camera 310 to capture the predetermined imaging range, and an image generation control to generate an image of the imaging range.

The image processor 327 performs the predetermined image processing on the image data outputted from the imaging camera 310, and detects a moving object such as a vehicle, a bicycle, or a pedestrian imaged in the image data.

In particular, upon detecting a moving object in the image data, the image processor 327 identifies the attributes, the direction of movement, and the moving speed of the detected moving object. The attributes include, for example, identification information such as a registration number of the detected moving object, and the kind of the detected moving object.

Thus, the image processor 327 provides the management server 20 or the driver assistance target vehicle M1 with each piece of the information regarding the attributes, the direction of movement, and the moving speed of the identified moving object, as the moving object detection information, together with the information regarding the installation position and the direction of photographing of the imaging camera 310.

In particular, the image processor 327 transmits the vehicle detection information regarding each vehicle, as the reference information, to the management server 20, and provides each driver assistance target vehicle M1 with all pieces of the moving object detection information regarding not only each vehicle but also a pedestrian, a bicycle, and the like.

The sensor storage 323 serves as a work area for the sensor processor 322 and the like, and its function is realized by hardware such as a RAM (VRAM).

Moreover, the sensor storage 323 holds, for example, information to identify an installation spot of the imaging camera 310, such as coordinates including the east longitude and the north latitude on the map data as x and y axes, and the direction of photographing of the imaging camera 310, e.g., a north direction or a southeast direction.

The timer manager 329 has a function of making measurement starting at the current date and time, or starting at predetermined timing. When the predetermined timing arrives or when a predetermined request is received, the timer manager 329 outputs the current time or a measurement result.

In particular, the timer manager 329 has the function of making the measurement starting at the current date and time, or starting at the predetermined timing. When the predetermined timing arrives or when the predetermined request is received, the timer manager 329 outputs the current time or the measurement result.

(B1.6) Method of this Embodiment (Driver Assistance Information Provision Processing)

(B1.6.1) Overview of Driver Assistance Information Provision Processing

Next, with reference to FIG. 6, description is given of the driver assistance information provision processing to be carried out by the management server 20 of this embodiment.

It is to be noted that FIG. 6 is a diagram for description of the driver assistance information provision processing to be carried out by the management server 20 of this embodiment. To allow the driver assistance target vehicle M1 to carry out the driver assistance control processing, the management server 20 of this embodiment is configured to make a determination as to the possibility of collision with the movement prediction target vehicle M2 and carry out the driver assistance information provision processing. The driver assistance information provision processing includes providing the relevant driver assistance target vehicle M1 with a result of the determination.

In particular, the management server 20 is configured to provide information to allow the driver assistance target vehicle M1 to carry out the driver assistance control in the target area including the multiple installation spots at each of which the observation system 30 is installed, and in which the multiple travel routes from the first installation spot to the second installation spot are present.

Moreover, the management server 20 is configured to carry out the reference information collection processing and carry out the frequency information acquisition processing. The reference information collection processing includes collecting in advance, as the reference information, a route or the like of each vehicle from the observation systems 30. The frequency information acquisition processing includes acquiring a frequency of previous passings of each vehicle between two spots (frequency information), based on the reference information.

Moreover, the management server 20 is configured to carry out the collision possibility estimation processing. The collision possibility estimation processing includes estimating the possibility of collision between the driver assistance target vehicle M1 and each movement prediction target vehicle M2, based on the acquired frequency information and the movement of each movement prediction target vehicle M2.

That is, the management server 20 is configured to learn travel history of each vehicle in the target area, and estimate the possibility of collision between the driver assistance target vehicle M1 and each movement prediction target vehicle M2 based on the route of the driver assistance target vehicle M1 and the predicted movement of each movement prediction target vehicle M2.

Moreover, the management server 20 is configured to provide the relevant driver assistance target vehicle M1 with a result of the estimation of the possibility of collision with the movement prediction target vehicle M2 (hereinafter, referred to as an "estimation result") as the driver assistance information.

It is to be noted that, based on the driver assistance information provided by the management server 20, the relevant driver assistance control system 10 is configured to give the driver an alarm about the collision with the movement prediction target vehicle M2, or carry out the driver assistance control processing such as the automated driving control.

Specifically, the management server 20 is configured to carry out the frequency information acquisition processing. The frequency information acquisition processing includes acquiring the frequency information, for each first installation spot, regarding the vehicle that has passed the first installation spot, for each combination of the first installation spot and the second installation spot (hereinafter, referred to as a "spot combination").

In particular, as illustrated in FIG. 6, the management server 20 carries out the reference information collection processing. The reference information collection processing includes collecting, as the reference information, the vehicle detection information regarding each vehicle that has passed each observation system 30, from each observation system 30.

Moreover, as illustrated in FIG. 6, the management server 20 is configured to acquire the frequency information, for each first installation spot, regarding each combination with another installation spot (that is, the second installation spot), by a statistical calculation method, based on the collected vehicle detection information.

Furthermore, as illustrated in FIG. 6, the management server 20 is configured to carry out the collision possibility estimation processing. The collision possibility estimation processing includes estimating the possibility of collision between the driver assistance target vehicle M1 of which the planned travel route in the predetermined area is recognizable and the movement prediction target vehicle M2, based on the frequency information for each spot combination.

In particular, as illustrated in FIG. 6, the management server 20 is configured to identify the spot combination route that crosses the planned travel route to be traveled by the driver assistance target vehicle M1 from the current position, as a crossing route, based on data held in advance.

Moreover, as illustrated in FIG. 6, upon detecting the movement prediction target vehicle M2 traveling on the identified crossing route and meeting a predetermined condition based on each piece of the frequency information, the management server 20 is configured to determine that the possibility of collision with the movement prediction target vehicle M2 is present, as the collision possibility estimation processing.

It is to be noted that, as illustrated in FIG. 6, when determining, by the collision possibility estimation processing, that the possibility of collision between the driver assistance target vehicle M1 and the movement prediction target vehicle M2 is present, the management server 20 is configured to provide the relevant driver assistance target vehicle M1 with the driver assistance information including the relevant contents.

Thus, based on the driver assistance information provided, the driver assistance control system 10 of the relevant driver assistance target vehicle M1 is configured to carry out a notification control, the automated driving control, or both. The notification control includes giving the driver a notification.

Moreover, as illustrated in FIG. 6, when acquiring the frequency information, the management server 20 may internally register the acquired frequency information, and carry out the collision possibility estimation processing with reference to the relevant frequency information registered.

With this configuration, it is possible for the management server 20 of this embodiment to precisely predict the movement of the undetectable vehicle of which the current position on the road, the route, and the like is undetectable, by using the data obtained by collecting the actual movement of the vehicle. The undetectable vehicle includes, for example, the vehicle devoid of the road-to-vehicle communication function.

Moreover, it is possible for the management server 20 of this embodiment to avoid collision between the driver assistance target vehicle M1 and the movement prediction target vehicle M2 such as the vehicle devoid of the road-to-vehicle communication function and the like, making it possible to provide safer driver assistance.

(B1.6.2) Spot Combination and Spot Combination Route

Next, with reference to FIG. 7, description is given of the combination of the first installation spot and the second installation spot in this embodiment and the spot combination route. The spot combination route is the route for each spot combination.

It is to be noted that FIG. 7 is a diagram for description of the spot combination and the spot combination route in this embodiment.

(Spot Combination)

In the driver assistance control processing of this embodiment, to collect the frequency information as the reference information, the spot combinations based on the combination of the first installation spot and the second installation spot are identified in advance for each first installation spot.

Specifically, the spot combination is a combination of two or more spots defined in the target area. The target area is an area including multiple installation spots at which the respective observation systems 30 are installed and in which multiple travel routes from the first installation spot to the second installation spot are present.

Moreover, each spot combination is a combination of each first installation spot and other multiple installation spots defined for each first installation spot, and includes the first installation spot and one or more second installation spots as spots to be passed by each vehicle that has passed the first installation spot.

In particular, the second installation spot of each spot combination is an installation spot other than the relevant first installation spot, and is an installation spot to be passed without making a detour by the shortest route from the relevant first installation spot after the vehicle passes the first installation spot.

Moreover, in each spot combination, one installation spot may be identified as the second installation spot, or alternatively, two or more installation spots may be identified. As for combinations of three or more installation spots, when the combinations include the same installation spots in the different order, the combinations are identified as different combinations.

Furthermore, as for routes of each spot combination, even when there are multiple routes from each installation spot of each spot combination toward outside the target area, the multiple routes are treated as the same route as long as the combination of the installation spots is the same (inclusive of the order).

It is to be noted that, as described above, the frequency information of this embodiment is calculated for each first installation spot and for each spot combination identified, and is held in the frequency information storage 243.

For example, in the target area in which the observation systems 30 are installed at the installation spots A, B, C, and D illustrated in FIG. 7, when the installation spot A is the first installation spot, the installation spots B, C, and D are the second installation spots.

In other words, in the case mentioned above, assuming that the installation spot A is the first installation spot, the spot combinations are: the installation spots A-B; the installation spots A-C; the installation spots A-D: the installation spots A-B-D; and the installation spots A-C-D.

It is to be noted that in the example in FIG. 7, it is assumed that the installation spots are on the shortest route and are to be passed without making a detour. Moreover, as for the combination of three or more installation spots, it is assumed that the installation spots meet a condition that the spot combinations including the same installation spots in the different order are different combinations.

Furthermore, in the example in FIG. 7, there are multiple routes toward outside the target area at each of the installation spots B, C, and D. However, as described above, in this embodiment, the routes at each installation spot are treated as one route without distinguishing each route. For example, at the installation spot C illustrated in FIG. 7, there are routes upward, rightward, and downward in the figure. However, out of these routes, the routes upward and rightward are routes toward outside the target area. Accordingly, these routes are treated as one route.

(Spot Combination Route)

The spot combination route is a route defined by each spot combination, and is identified for each first installation spot and for each spot combination identified.

In particular, the spot combination route corresponding to the spot combination is not limited to a single route. In some cases, multiple routes are defined depending on the target area, an installation state of the observation systems 30, or both.

For example, in the target area where the observation system 30 is installed at each of the installation spots A, B, C, and D illustrated in FIG. 7, let us assume a case where the installation spot A is the first installation spot, and the installation spots B, C, and D are the second installation spots.

As for each spot combination route in this case, according to the condition mentioned above, the installation spots A-B are assumed to include one route toward outside the target area at the installation spot B (inclusive of the routes leftward and downward), and two routes toward outside the target area without passing the installation spot D after passing the installation spot B.

Moreover, the installation spots A-C are assumed to include one route toward outside the target area at the installation spot C (inclusive of the routes rightward and upward), and one route toward outside the target area without passing the installation spot D after passing the installation spot C.

Furthermore, the installation spots A-D are assumed to include eight routes. The installation spots A-B-D and the installation spots A-C-D are each assumed to include one route.

It is to be noted that, in this case, it is assumed that the installation spots A-B and the installation spots A-C do not pass the installation spot D, and that the installation spots A-D do not pass the installation spots B and C.

Moreover, out of the spot combination routes described above, the installation spots A-B and the installation spots A-C each include a route toward outside the target area without passing the installation spot D.

For example, as for the installation spots A-C, as illustrated in FIG. 7, a route that passes the installation spot C downward in the figure and crosses rightward an intersection (devoid of the observation system 30) located one block below the installation spot C (a route toward outside the target area without passing the installation spot D) is assumed to be one route.

Moreover, in this embodiment, each spot combination route identified for each first installation spot includes routes other than those described above that pass only the first installation spot and do not pass the installation spots B, C, and D.

(B1.6.3) Reference Information Collection Processing

Next, description is given of the reference information collection processing to be carried out by the management server 20 of this embodiment.

The data obtainer 212 carries out the reference information collection processing. The reference information collection processing includes collecting the vehicle detection information regarding each vehicle (passing vehicle) that has passed each installation spot. The vehicle detection information is information regarding each vehicle detected at each predetermined timing by the multiple observation systems 30 installed in the target area.

That is, the data obtainer 212 collects the vehicle detection information (reference information) such as the attributes (the registration number and the kind), the direction of movement, and the moving speed of the vehicle. The vehicle detection information is information detected by each of the multiple observation systems 30 at each predetermined timing.

In particular, the data obtainer 212 may output the vehicle detection information collected by the reference information collection processing, for each observation system 30, collectively at regular intervals to the data analyzer 213.

Alternatively, the data obtainer 212 may store the vehicle detection information in time series in the data storage 242.

It is to be noted that each piece of the vehicle detection information of this embodiment includes information regarding the position on the map data and the direction of photographing of the corresponding one of the observation systems 30.

Moreover, each collected piece of the vehicle detection information is held in the vehicle detection information storage 244 for each observation system 30.

(B1.6.4) Frequency Information Acquisition Processing

Next, description is given of the frequency information acquisition processing to be carried out by the management server 20 of this embodiment.
(Overview of Frequency Information Acquisition Processing)

Based on the collected reference information (vehicle detection information), the data analyzer 213 carries out the frequency information acquisition processing. The frequency information acquisition processing includes calculating, for each spot combination, each frequency at which the vehicle that has previously passed the first installation spot passes the second installation spots, to acquire the frequency information.

That is, the data analyzer 213 carries out, as the frequency information acquisition processing, calculation processing of calculating, as the frequency, for each first installation spot, each probability (ratio) of vehicles passing each of the second installation spots, out of the vehicles that have passed the first installation spot.

In particular, the data analyzer 213 acquires the reference information collected within a certain period of time (for example, one year) held in the vehicle detection information storage 244. Based on the reference information acquired, the data analyzer 213 calculates the frequency for each spot combination, as the frequency information acquisition processing.

Moreover, as for the spot combination, the data analyzer 213 calculates the frequency, not only for each combination of each first installation spot and the single second installation spot but also for combinations of each first installation spot and two or more second installation spots.

Furthermore, as for the combinations including two or more different second installation spots, the data analyzer 213 calculates the frequency of each combination, assuming that the combinations in which the vehicle passes the second installation spots in the different order are different combinations. However, even when there are multiple routes (i.e., spot combination routes) for each spot combination, the data analyzer 213 calculates one frequency in association with the spot combination including the multiple routes, rather than calculating the frequency for each spot combination route.

Specifically, for each spot combination, the data analyzer 213
(1) Calculates the total number of vehicles passing a reference spot at the first installation spot,
(2) Calculates the total number of vehicles passing the corresponding second installation spot,
(3) Calculates each frequency based on (1) and (2), and
(4) Detects additional information.

It is to be noted that the data analyzer 213 may store the calculated frequency for each spot combination, as the frequency information, in the data storage 242 together with the additional information. Alternatively, the data analyzer 213 may provide the collision estimation processor 214 with the calculated frequency as it is.

Moreover, in this embodiment, the first installation spot indicates the spots where the respective observation systems 30 are installed in the target area. The second installation spot indicates all the other installation spots with respect to each first installation spot.

Furthermore, in the following description, the spot combination route based on two spots is basically expressed as a route (i, j).

In particular, when the multiple second installation spots are to be passed, the second installation spot to be finally passed is expressed as (jG), and the other second installation spots are expressed as (j1) to (jn). At this occasion, the spot combination route through the multiple spots is expressed as a route (i, j1, ..., jn, jG).
(1. Calculation of Total Number of Vehicles Passing Reference Spot at Each First Installation Spot)

When each piece of the vehicle detection information (reference information) transmitted from each of the observation systems 30 during a predetermined collection period is collected, the data analyzer 213 sets each installation spot to the first installation spot (i).

Moreover, the data analyzer 213 totalizes, for each first installation spot (i), the total number of vehicles passing the first installation spot (hereinafter, referred to as "total number of passings through the reference spot") Z(i).

For example, the data analyzer 213 identifies the installation spot that each vehicle has passed, based on the attributes (registration number) included in the vehicle detection information in a certain period of time, and totalizes the total number Z(i) of passings through the reference spot for each first installation spot (i).

At this occasion, the data analyzer 213 may simply totalize the total number of vehicles passing the first installation spot, for example, in all directions of movement, e.g., four directions in the case of an intersection of a crossroad. Alternatively, the data analyzer 213 may totalize the total number of vehicles passing the first installation spot for each predetermined direction of movement.
(2. Calculation of Total Number of Vehicles Passing Second Installation Spot)

Next, the data analyzer 213 totalizes, for each spot combination route, the total number Z(i, j) of passings between the spots, with respect to the vehicles that have passed both the relevant first installation spot (i) and the second installation spot (j).
(3. Frequency Calculation)

Thus, the data analyzer 213 carries out a calculation process given by (Expression 1) based on the total number Z(i) of passings through the reference spot and the total number Z(i, j) of passings between the spots with reference to each first installation spot, to calculate the frequency P(i, j) for each spot combination route (i, j).

[Mathematical Expression 1]

$$P(i, j) = Z(i, j)/Z(i) \qquad \text{(Expression 1)}$$

(4. Detection of Additional Information)

When calculating the frequency mentioned above, the data analyzer 213 detects, as the additional information, the moving speed at which each vehicle involved in the totalization passes the first installation spot, and necessary time for each vehicle to pass the corresponding second installation spot.

In particular, the data analyzer 213 detects the necessary time for each vehicle based on the first spot time at which each vehicle passes the first installation spot and the second spot time at which each vehicle passes the corresponding second installation spot.

Thus, the data analyzer 213 identifies the necessary time corresponding to the moving speed, for each spot combination route, or identifies a mathematical expression to identify the necessary time. The data analyzer 213 provides the identified necessary time or the mathematical expression as the additional information to the collision possibility estimation processing.

Specifically, the data analyzer 213 calculates a representative value for each necessary time, e.g., an average value, a mode value, or a median value, for each spot combination route and for each predetermined moving speed. The data analyzer 213 uses the calculated representative value as the additional information regarding the necessary time with respect to the moving speed.

Moreover, the data analyzer 213 carries out calculation processing such as the least squares method based on the moving speed and the necessary time of each vehicle, for each spot combination route, to obtain a mathematical function (mathematical expression) indicating the necessary time corresponding to the moving speed. The data analyzer 213 uses the obtained mathematical expression as the additional information.

(Example of Frequency Information Acquisition Processing)

For example, as illustrated in FIG. 7 described above, let us assume a case where the four observation systems 30 are installed at the specific installation spots (intersection spots) A, B, C, and D in the target area.

When each piece of the vehicle detection information (reference information) transmitted from each of the observation systems 30 during the predetermined collection period is collected, the data analyzer 213 calculates the frequency for each spot combination, as summarized in Table 1.

In particular, when the point A is set as the first installation spot, the data analyzer 213 sets the spot B, the spot C, and the spot D as the second installation spots, as the shortest route.

Thus, the data analyzer 213 identifies the total number $Z(1)$ of passings through the reference spot detected at the spot A, and the total number $Z(i, j)$ of passings between the spots with respect to the vehicles that have passed the spot A and have passed the other spots B, C, or D.

It is to be noted that, depending on the spot combination, there are multiple routes even when detour routes are excluded, for example, as the route passing the spot A and passing the spot D. However, even when there are multiple routes, the total number of passings between the spots is identified as the total number of passings through the set spots.

Finally, the data analyzer 213 calculates the frequency for each spot combination route, as summarized in Table 1, based on each identified numerical value Z.

In particular, as described above, the data analyzer 213 identifies the total number of vehicles and calculates the frequency, with respect to each of the cases where the routes pass the multiple different second installation spots B, C, or D with respect to the first installation spot.

TABLE 1

| Combination routes between two spots | Frequency |
|---|---|
| Spot A → Spot B without passing Spot D | $P(A, B) = Z(A, B)/Z(A)$ |
| Spot A → Spot C without passing Spot D | $P(A, C) = Z(A, C)/Z(A)$ |
| Spot A → Spot D without passing Spots A and B | $P(A, D) = Z(A, D)/Z(A)$ |
| Spot A → Spot B → Spot D | $P(A, B, D) = Z(A, B, D)/Z(A)$ |
| Spot A → Spot C → Spot D | $P(A, C, D) = Z(A, C, D)/Z(A)$ |
| Passing only Spot A | $P(\text{only } A) = 1 - P(A, B) - P(A, C) - P(A, D) - P(A, B, D) - P(A, C, D)$ |

It is to be noted that the data analyzer 213 does not set any combinations between two spots other than summarized above because the data analyzer 213 sets the points B, C, and D as the second installation spots as the shortest route.

For example, the data analyzer 213 does not set any combinations, after passing the first installation spot, e.g., a spot combination that makes a route passing the spot B after passing the point D, and a combination that makes a route passing the spot C after passing the point B.

Moreover, as illustrated in FIG. 7, with respect to the spots B, C, and D, the data analyzer 213 calculates the frequency while limiting a direction of passing of the vehicle without assuming a detour, or assuming the shortest route. Furthermore, at each of the installation spots B, C, and D, when there are multiple routes toward outside the target area after passing the installation spots, the data analyzer 213 handles the routes as one route without distinguishing each route, and identifies the number of the passing vehicles.

That is, as for the installation spots B and C, the data analyzer 213 identifies the number of the passing vehicles while limiting the routes to two routes, i.e., the route toward outside the target area and the route that remains in the target area. As for the installation spot D, the data analyzer 213 identifies the number of the passing vehicles while limiting the direction of passing to that corresponding to the routes toward outside the target area.

(Provision to Collision Estimation Processor)

The data analyzer 213 may store the frequency information identified by the calculation or the detection at predetermined timing in the data storage 242, and provide the frequency information held, on the occasion of the collision possibility estimation processing.

The data analyzer 213 provides the collision estimation processor 214 with the information regarding the frequency of each spot combination route for each first installation spot, as the frequency information. Alternatively, the data analyzer 213 provides the collision estimation processor 214 with the information regarding the frequency of each spot combination route and the additional information, as the frequency information.

Specifically, the data analyzer 213 may directly provide the collision estimation processor 214 with the frequency information including the information regarding the calculated frequency and the detected additional information.

(B1.6.5) Collision Possibility Estimation Processing

Next, with reference to FIGS. 8 and 9, description is given of the collision possibility estimation processing to be carried out by the management server 20 of this embodiment.

It is to be noted that FIGS. 8 and 9 are diagrams for description of the collision possibility estimation processing to be carried out by the management server 20 of this embodiment.

(Principles of Collision Possibility Estimation Processing)

Upon receiving a command to provide the driver assistance information, the collision estimation processor 214 carries out the collision possibility estimation processing based on the frequency information provided by the data analyzer 213.

In particular, the collision estimation processor 214 acquires the travel route information provided by the driver assistance target vehicle M1 and the spot combination route information held in the data storage 242, to carry out the collision possibility estimation processing.

Thus, the collision estimation processor 214 carries out the following processes (1) to (4) to carry out the collision possibility estimation processing of estimating the possibility of collision between the driver assistance target vehicle M1 and the movement prediction target vehicle M2.

(1) First, the collision estimation processor 214 identifies predicted routes that cross the planned travel route of the driver assistance target vehicle M1 and are predicted as routes of the movement prediction target vehicle M2, out of the multiple spot combination routes.

(2) Moreover, the collision estimation processor 214 identifies spots where the planned travel route of the driver assistance target vehicle M1 and the predicted routes cross, as specific intersection spots, and estimates the arrival time of the driver assistance target vehicle M1 that reaches each of the specific intersection spots along the planned travel route.

(3) Thus, the collision estimation processor 214 detects the movement prediction target vehicle M2 that is assumed to travel along the predicted routes, and estimates the arrival time of the relevant movement prediction target vehicle M2 at each of the specific intersection spots.

(4) Finally, the collision estimation processor 214 compares the arrival time of the driver assistance target vehicle M1 and the arrival time of the movement prediction target vehicle M2, and performs estimation processing of estimating the possibility of collision between the driver assistance target vehicle M1 and the movement prediction target vehicle M2 at each of the specific intersection spots.

It is to be noted that the collision estimation processor 214 of this embodiment carries out the collision possibility estimation processing upon every receipt of the command to provide the driver assistance information.

For example, in the driver assistance target vehicle M1, the command to provide the driver assistance information is transmitted every time the route to the destination is reset or every time the target area in which the driver assistance is provided is changed.

(1. Identification of Predicted Route)

First, the collision estimation processor 214 identifies the spot combination routes that meet a predetermined condition, out of the multiple spot combination routes for each first installation spot, as the predicted routes that cross the planned travel route of the driver assistance target vehicle M1.

In particular, upon receiving the travel route information, the collision estimation processor 214 identifies the route to be traveled from the current position of the relevant driver assistance target vehicle M1 (that is, the planned travel route) based on the information regarding the route of the driver assistance target vehicle M1 included in the travel route information.

Thus, the collision estimation processor 214 compares the multiple spot combination routes for each first installation spot with the identified planned travel route, and identifies the spot combination routes that cross the planned travel route as the predicted routes.

For example, as illustrated in FIG. 8, let us assume a case where the driver assistance target vehicle M1 enters the target area and the planned travel route PR from an entry point a is identified, and the combination routes corresponding to each spot combination are set.

In this case, as illustrated in FIG. 8, the collision estimation processor 214 identifies, for example, the routes with the spot combinations of the spots A-C, the spots A-C-D, and the spots A-D as the predicted routes. That is, as illustrated in FIG. 8, the collision estimation processor 214 identifies the combination routes including a partial route CR1, a partial route CR2, and a partial route CR3 as the predicted routes.

(2. Identification of Specific Intersection Spots and Identification of Arrival Time of Driver Assistance Target Vehicle)

Next, the collision estimation processor 214 identifies the arrival time of the driver assistance target vehicle M1 at each of the specific intersection spots based on, for example, the moving speed and the current position of the driver assistance target vehicle M1 at the timing of acceptance of the command to provide the driver assistance information, and the planned time identification information included in the travel route information.

In particular, the collision estimation processor 214 calculates a distance from the current position to the specific intersection spot based on the current position of the driver assistance target vehicle M1 and a position of the specific intersection spot, and identifies the arrival time at the specific intersection spot based on the calculated distance and the current moving speed.

For example, in the example in FIG. 8 described above, the collision estimation processor 214 identifies the specific intersection spots IS1, IS2, and IS3 as the specific intersection spots.

Thus, for example, the collision estimation processor 214 estimates the arrival time T[M1]1 (after 60 seconds) of the driver assistance target vehicle M1 at the specific intersection spot IS1, the arrival time T[M1]2 (after 210 seconds) at the specific intersection spot IS2, and the arrival time T[M1]3 (after 300 seconds) at the specific intersection spot IS3.

(3. Detection of Movement Prediction Target Vehicle and Estimation of Arrival Time at Specific Intersection Spot)

The collision estimation processor 214 identifies the first installation spots of the respective spot combination routes identified as the predicted routes, and detects the movement prediction target vehicle M2 for each of the relevant first installation spots (hereinafter, referred to as "first specific installation spots").

Specifically, the collision estimation processor 214 acquires, for each first specific installation spot, the vehicle detection information provided by the observation system 30 installed at the relevant first specific installation spot.

Thus, the collision estimation processor 214 refers, for each first specific installation spot, to the vehicle detection information detected after predetermined timing, and detects the vehicle identified by the vehicle detection information as the movement prediction target vehicle M2.

At this occasion, the collision estimation processor 214 detects, for each first specific installation spot, the vehicle traveling from the first installation spot toward a direction in which the specific intersection spot is present after the predetermined timing, out of the vehicles identified by the vehicle detection information, as the movement prediction target vehicle M2.

In particular, the predetermined timing of this embodiment indicates timing of the acceptance of the command to provide the driver assistance information (hereinafter, referred to as "command timing"), or timing that is before the command timing and is predetermined timing (hereinafter, referred to as "designated timing").

It is to be noted that when the specified intersection spot is closer to, for example, the corresponding first installation spot than to the current position of the driver assistance target vehicle M1 at the command timing, it is sometimes impossible to detect the vehicles having high possibility of collision without omission by vehicle detection after the command timing.

That is, there are cases where a vehicle that has not been detected as the movement prediction target vehicle M2 before the command timing is assumed to pass the specific intersection spot at the same timing as the driver assistance target vehicle M1.

For example, when the driver assistance target vehicle M1 reaches the specific intersection spot 10 seconds after the current time, and it takes 20 seconds for the movement prediction target vehicle M2 to travel from the first specific installation spot to the specific intersection spot, there are cases where the driver assistance target vehicle M1 collides with a vehicle that has passed the first specific installation spot before the command timing.

Thus, when there is such possibility, the collision estimation processor 214 of this embodiment may use the timing before the command timing by a predetermined period of time, as the designated timing.

Meanwhile, in addition to the forgoing, upon detecting the movement prediction target vehicle M2, the collision estimation processor 214 identifies, based on the corresponding vehicle detection information, the moving speed of the vehicle detected as the movement prediction target vehicle M2 at the corresponding first specific installation spot.

Thus, the collision estimation processor 214 estimates, for each predicted route, the arrival time of each of the movement prediction target vehicles M2 at the specific intersection spot, based on the distance from the corresponding first installation spot to the specific intersection spot and the corresponding moving speed.

For example, let us assume a case where, in the example illustrated in FIGS. 7 and 8, the movement prediction target vehicle M2 is detected at the spot A as the first identified installation spot, and the moving speed in the vehicle detection information is 30 km/h.

In this case, as illustrated in FIG. 9, the collision estimation processor 214 estimates the arrival time T[M2]1 to T[M2]3 of the movement prediction target vehicle M2 at the specific intersection spots IS1 to IS3 based on the position of the first specific installation spot and the moving speed.

In particular, the collision estimation processor 214 estimates the arrival time T[M2]1 as 600 seconds, the arrival time T[M2]2 as 400 seconds, and the arrival time T[M2]3 as 295 seconds.

It is to be noted that in the example in FIG. 9, it is assumed that, on the spot combination routes including the route CR1, the route CR2, and the route CR3, the moving speeds in the vehicle detection information are the same, and there are no differences in the arrival time due to differences in the spot combination routes.

(4. Carrying out Collision Possibility Determination Processing)

The collision estimation processor 214 compares the arrival time of the driver assistance target vehicle M1 (hereinafter, referred to as "determination reference time") with the arrival time of the corresponding movement prediction target vehicle M2 (hereinafter, referred to as "determination target time") for each specific intersection spot and for each detected movement prediction target vehicle M2.

Moreover, the collision estimation processor 214 refers to the frequency information regarding the spot combination route identical with each predicted route on which the detected movement prediction target vehicle M2 is expected to travel, and identifies the frequency of each predicted route.

Thus, the collision estimation processor 214 estimates the possibility of collision between the driver assistance target vehicle M1 and the detected movement prediction target vehicle M2 based on relation between the determination target time and the determination reference time, and the frequency of the predicted route.

Specifically, the collision estimation processor 214 determines whether or not the relation between the determination target time and the determination reference time meets a predetermined first condition, determines whether or not the frequency of the predicted route meets a predetermined second condition, and estimates the possibility of collision described above, based on the two determination results.

For example, the collision estimation processor 214 estimates the possibility of collision described above, by assuming, as the first condition, that the determination target time and the determination reference time has a predetermined time difference (for example, a ±10 second difference), and assuming, as the second condition, that the frequency is equal to or higher than a certain value (for example, 0.9 in the case of the example described above).

Thus, when both conditions, i.e., the first condition and the second condition, are met, the collision estimation processor 214 determines that the possibility of collision between the driver assistance target vehicle M1 and the detected movement prediction target vehicle M2 is the highest.

Moreover, when only one of the first condition and the second condition is met, e.g., when only the first condition is met, or when only the second condition is met, the collision estimation processor 214 determines that the possibility of collision between the driver assistance target vehicle M1 and the detected movement prediction target vehicle M2 is moderate.

Furthermore, when neither of the conditions, i.e., the first condition and the second condition, are met, the collision estimation processor 214 determines that the possibility of collision between the driver assistance target vehicle M1 and the detected movement prediction target vehicle M2 is low.

It is to be noted that, in the examples in FIGS. 8 and 9, let us assume a case where the arrival time of the driver assistance target vehicle M1 at the specific intersection spot IS1 is 10 seconds, the arrival time of the movement prediction target vehicle M2 at the specific intersection spot IS1 is 600 seconds, and the frequency is 0.03.

In this case, because neither the first condition nor the second condition is met, the collision estimation processor 214 determines that the possibility of collision is low.

Moreover, in the examples in FIGS. 8 and 9, let us assume a case where the arrival time of the driver assistance target vehicle M1 at the specific intersection spot IS2 is 210 seconds, the arrival time of the movement prediction target vehicle M2 at the specific intersection spot IS2 is 400 seconds, and the frequency is 0.005.

In this case, because neither the first condition nor the second condition is met, the collision estimation processor 214 determines that the possibility of collision is low.

Meanwhile, in the examples in FIGS. 8 and 9, let us assume a case where the arrival time of the driver assistance target vehicle M1 at the specific intersection spot IS2 is 300 seconds, the arrival time of the movement prediction target vehicle M2 at the specific intersection spot IS2 is 295 seconds, and the frequency is 0.95.

In this case, because both the first condition and the second condition are met, the collision estimation processor 214 determines that the possibility of collision is high.

It is to be noted that although not illustrated as the examples in FIGS. 8 and 9, for example, let us assume a case where the arrival time of the driver assistance target vehicle M1 at the specific intersection spot IS(x) is 300 seconds, the arrival time of the movement prediction target vehicle M2 at the specific intersection spot IS(x) is 290 seconds, and the frequency is 0.1. In this case, because the time difference is within +10 seconds and only the first condition is met, the collision estimation processor 214 determines that the possibility of collision is moderate.

(B1.6.6) Provision of Driver Assistance Information

Next, description is given of provision of the driver assistance information to be carried out by the management server 20 of this embodiment.

As described above, the driver assistance information providing unit 218 provides the driver assistance control system 10 of the corresponding driver assistance target vehicle M1 with the determination result of the collision possibility estimation processing carried out by the collision estimation processor 214, as estimation result information.

That is, the driver assistance information providing unit 218 carries out, for example, notification processing. The notification processing includes notifying the corresponding driver assistance control system 10 of the possibility of collision with a random vehicle having the highest possibility of collision.

In particular, the driver assistance information providing unit 218 provides the corresponding driver assistance control system 10 with phased flag information, as the estimation result information. The phased flag information indicates the possibility of collision between the driver assistance target vehicle M1 and the corresponding movement estimation target vehicle M2.

For example, in the example described above, the driver assistance information providing unit 218 provides the driver assistance control system 10 of the corresponding driver assistance target vehicle M1 with any one of the estimation results in the three phases: "the possibility of collision is high", "the possibility of collision is moderate", and "the possibility of collision is low", as the estimation result information.

It is to be noted that, when receiving the phased flag information, the driver assistance control system 10 carries out the driver assistance control processing based on the kind of the flag information. The driver assistance control processing includes providing driver assistance such as the alarm process for the driver or the automated driving control (to change the vehicle speed or the route).

For example, when acquiring the estimation result that "the possibility of collision is high", the driver assistance control system 10 carries out, as the alarm process, a process of giving a notification that "There is high possibility of collision with a vehicle at such and such an intersection spot. Please be careful.".

In particular, in the examples in FIGS. 8 and 9 described above, when giving an alert by vision, the driver assistance control system 10 of the driver assistance target vehicle M1 carries out, as the alarm process, a process of giving a notification that "There is high possibility of collision with a vehicle at the specific intersection spot IS2. Please be careful.".

Similarly, for example, when acquiring the estimation result that "the possibility of collision is high", the driver assistance control system 10 carries out, as the automated driving control, a process of reducing the vehicle speed of the driver assistance target vehicle M1 (e.g., reducing the vehicle speed by 20%), or changes the planned travel route.

Moreover, for example, when acquiring the estimation result that "the possibility of collision is moderate", the driver assistance control system 10 carries out, as the alarm process, a process of giving a notification that "There is possibility of collision with a vehicle at such and such an intersection spot. Please be careful.".

Furthermore, for example, when acquiring the estimation result that "the possibility of collision is low", the driver assistance control system 10 carries out, as the alarm process, a process of giving a notification that "please watch out for collision with a vehicle at such and such an intersection spot".

In particular, in the examples in FIGS. 8 and 9 described above, the driver assistance control system 10 of the driver assistance target vehicle M1 carries out, as the alarm process, a process of giving a notification that "please watch out for collision with a vehicle at the specific intersection spot IS1".

Similarly, for example, when acquiring the estimation result that "the possibility of collision is low", the driver assistance control system 10 carries out, as the automated driving control, a process of reducing or increasing the vehicle speed of the driver assistance target vehicle M1 (a process of changing the speed to make a timing shift).

(B1.7) Operation of this Embodiment (B1.7.1) Operation of Frequency Information Acquisition Processing Next, with reference to FIG. 10, description is given of operation of the frequency information acquisition processing to be carried out by the management server 20 of this embodiment.

It is to be noted that FIG. 10 is a flowchart illustrating the operation of the frequency information acquisition processing to be carried out by the management server 20 of this embodiment.

This operation is operation to be carried out at each predetermined timing, for example, at timing when any vehicle having the vehicle-to-vehicle communication function or the road-to-vehicle communication function such as an in-vehicle communication device, e.g., a data communication module, has passed the installation spot of the observation system 30. Moreover, this operation is operation to be carried out for each predetermined target area.

Moreover, in this operation, it is assumed that the reference information collection processing has already been carried out, and the vehicle detection information provided by each observation system 30 has already been collected. It is assumed that the vehicle body detection information for a certain period of time is held in the vehicle detection information storage 244 in association with each observation system 30.

First, when the data analyzer 213 detects start timing of the frequency information acquisition processing in the predetermined target area (step S101), the data analyzer 213 acquires the vehicle detection information for a certain period of time for each observation system 30 already held in the vehicle detection information storage 244 (step S102).

For example, the data analyzer 213 detects the start timing such as timing scheduled in advance or timing of acceptance of a command by an administrator.

Next, the data analyzer 213 refers to each piece of the spot combination route information in the corresponding target area held in the data storage 242, and analyzes each piece of the vehicle detection information detected by each of the observation systems 30 based on the relevant route information (step S103).

Next, the data analyzer 213 calculates the total number of the vehicles passing the reference spot at each first installation spot (step S104), and calculates the total number of the vehicles passing each second installation spot for each first installation spot (step S105).

Next, the data analyzer 213 calculates the frequency of each spot combination route for each first installation spot (step S106).

Next, the data analyzer 213 detects the additional information such as the moving speed of the vehicle for each spot combination route at each first installation spot and the necessary time for the vehicle that has passed the first installation spot to pass the corresponding second installation spot (step S107).

It is to be noted that, instead of the necessary time, the data analyzer 213 may detect, as the additional information, the calculation expression to calculate the necessary time.

Finally, the data analyzer 213 stores the frequency of each spot combination route for each first installation spot in the frequency information storage 243 as the frequency information (step S108), and ends this operation.

It is to be noted that, in the process in step S107, when the frequency information regarding the same spot combination route at the same first installation spot has been already held in the frequency information storage 243, the data analyzer 213 updates and registers the frequency information.

(B1.7.2) Operation of Driver Assistance Information Provision Processing

Next, with reference to FIGS. 11 and 12, description is given of operation of the driver assistance information provision processing to be carried out by the management server 20 of this embodiment.

It is to be noted that FIGS. 11 and 12 are flowcharts illustrating the operation of the driver assistance information provision processing to be carried out by the management server 20 of this embodiment.

This operation is operation to be carried out at every predetermined timing such as timing of entry into a new target area.

Moreover, in this operation, it is assumed that the frequency information including the additional information has been already held in the frequency information storage 243, and the command to provide the driver assistance information in accompaniment with the entry of the vehicle (driver assistance target vehicle) M1 into the new target area has been transmitted from the driver assistance control system 10.

First, upon receiving the command to provide the driver assistance information from the driver assistance control system 10 of the driver assistance target vehicle M1 (step S201), the collision estimation processor 214 acquires the travel route information regarding the driver assistance target vehicle M1 from the relevant driver assistance control system 10 (step S202).

Next, based on the travel route information regarding the driver assistance target vehicle M1, the collision estimation processor 214 identifies the planned travel route of the relevant driver assistance target vehicle M1 (step S203).

Next, the collision estimation processor 214 refers to each piece of the spot combination route information for each first installation spot held in the data storage 242, and identifies each spot combination route that crosses the planned travel route, as the predicted route (step S204).

At this occasion, the collision estimation processor 214 also identifies the specific intersection spots at which the planned travel route and the predicted routes cross.

Next, the collision estimation processor 214 determines whether or not one or more predicted routes have been identified (step S205). When determining that one or more predicted routes have been identified, the collision estimation processor 214 causes the flow to proceed to a process of step S207. When determining that no predicted routes have been identified, the collision estimation processor 214 ends this operation.

Next, the collision estimation processor 214 refers to the frequency information corresponding to each identified predicted route, and estimates, for each specific intersection spot, the arrival time of the driver assistance target vehicle M1 that reaches the relevant specific intersection spot, based on the corresponding additional information (such as the moving speed) (step S207).

Next, the collision estimation processor 214 determines whether or not the ending condition of this operation has been met, e.g., whether or not the driver assistance target vehicle M1 has passed all the specific intersection spots (step S208). When determining that the ending condition of this operation has been met, the collision estimation processor 214 ends this operation directly.

It is to be noted that the ending condition of this embodiment includes, in addition to the forgoing, for example, that the route of the relevant driver assistance target vehicle M1 has been changed, and that a driving unit has stopped, e.g., that an engine of the driver assistance target vehicle M1 has been stopped, or that a driving power supply of a motor has been turned off.

Meanwhile, when determining that the ending condition of this operation is not met, the collision estimation processor 214 excludes, from targets of the collision possibility estimation processing, the specific intersection spot the driver assistance target vehicle M1 has already passed, and the predicted route in which the relevant specific intersection spot is included in the route (step S209).

Next, the collision estimation processor 214 determines whether or not the movement prediction target vehicle M2 has been detected, based on the vehicle detection information transmitted from the observation system 30 at the first installation spot on each predicted route (step S210).

At this occasion, when determining that the movement prediction target vehicle M2 has been detected on one or more predicted routes, the collision estimation processor 214 causes the flow to proceed to a process of step S211. When determining that the movement prediction target vehicle M2 has not been detected on any predicted routes, the collision estimation processor 214 causes the flow to proceed to the process of step S208.

Next, when determining that the movement prediction target vehicle M2 has been detected on one or more predicted routes, the collision estimation processor 214 estimates the arrival time of the relevant movement prediction target vehicle M2 at the specific intersection spot (step S211).

It is to be noted that, at this occasion, the collision estimation processor 214 estimates the arrival time of the relevant movement prediction target vehicle M2 at the specific intersection spot, based on the frequency information regarding the spot combination route identical with the relevant predicted route.

Next, the collision estimation processor 214 compares the arrival time of the driver assistance target vehicle M1 at each specific intersection spot with the arrival time of the corresponding movement prediction target vehicle M2, to calculate the time difference (step S212).

Next, the collision estimation processor 214 refers to the frequency information regarding the spot combination route identical with each predicted route on which the detected movement prediction target vehicle M2 is expected to travel, and identifies the frequency of each predicted route (step S213).

Next, the collision estimation processor 214 estimates the phased possibility of collision at each intersection spot based on the frequency of each predicted route and the time difference at the intersection spot between the driver assistance target vehicle M1 and the movement prediction target vehicle M2 assumed to travel each predicted route (step S214).

Next, the collision estimation processor 214 allows the driver assistance information providing unit 218 to provide the relevant driver assistance control system 10 with the collision possibility flag information (step S215), and causes the flow to proceed to the process of step S208. The collision possibility flag information indicates the phased possibility of collision with the movement prediction target vehicle M2.

(B1.8) Modification Examples (B1.8.1) Modification Example 1

In the forgoing embodiment, to acquire the frequency information, calculation is made based on the statistical calculation method based on the vehicle detection information acquired from the observation system 30. However, the frequency information may be acquired based on the route information regarding each vehicle provided by each vehicle to the management server 20.

In this case, the data analyzer 213 acquires the route information regarding routes actually passed with reference to each first installation spot, with respect to vehicles that have passed through the target area within a certain period of time. The data analyzer 213 acquires the frequency information based on the number of vehicles totaled for each route and the total number of vehicles of which the routes have been acquired.

It is to be noted that the data analyzer 213 may calculate all frequencies with respect to the route information regarding the routes passed with reference to each first installation spot.

Moreover, as with the embodiment described above, the data analyzer 213 may calculate the frequency separately for each route to be detected (for example, (A,B), (A,C), (A,D), (A,B,D), and (A,C,D)) with reference to the installation spot where the observation system 30 is installed.

It is to be noted that, in this case, as with the embodiment described above, the data analyzer 213 also calculates the frequency of the route that passes only the installation spot A (for example, (A only)).

Meanwhile, in this case, the data analyzer 213 detects, as the additional information, the moving speed at which each vehicle passes the first installation spot for each route, and the necessary time for each vehicle to pass the corresponding second installation spot.

In particular, as for the additional information, as with the forgoing description, the data analyzer 213 calculates the representative value for each necessary time such as the average value, the mode value, or the median value for each route and for each predetermined moving speed. The data analyzer 213 uses the calculated representative value as the additional information regarding the necessary time with respect to the moving speed.

Moreover, in this case, the collision estimation processor 214 carries out the collision possibility estimation processing similarly to this embodiment, based on the frequency information including the additional information thus acquired.

(B1.8.2) Modification Example 2

In the collision possibility estimation processing of the forgoing embodiment, instead of targeting all the spot combination routes with reference to each first installation spot, identification of those crossing the planned travel route may be made only with respect to the route of the mode value in the frequency information for each first installation spot.

That is, in this case, the collision estimation processor 214 identifies the route having the mode value, out of the spot combination routes for each first installation spot, as the predicted route, and identifies the spot combination route on which the predicted route and the planned travel route of the driver assistance target vehicle M1 cross.

Thus, in this case, the collision estimation processor 214 carries out the collision possibility estimation processing similarly to this embodiment, with respect to the spot combination routes thus identified.

(B1.8.3) Modification Example 3

In the forgoing embodiment, the vehicle detection information is detected by each observation system 30, but the management server 20 may detect the vehicle detection information based on the image data acquired from each observation system 30.

That is, in this modification example, the management server 20 may detect the vehicle detection information such as the attributes (registration number), the direction of movement, and the moving speed of the detected vehicle, from the image data captured by the observation systems 30 in the forgoing embodiment.

(B1.8.4) Modification Example 4

In the forgoing embodiment, each process is carried out by the management server 20, but the driver assistance control system 10 of each of the driver assistance target vehicles M1 may carry out the frequency information acquisition processing and the collision possibility estimation processing described above.

It is to be noted that, in this case, the driver assistance control system 10 constitutes the driver assistance system described above.

Meanwhile, the driver assistance control system 10 of each of the driver assistance target vehicles M1 may refer to the reference information collected and performed by the management server 20 and carry out the collision possibility estimation processing.

Moreover, when the frequency information acquisition processing is carried out by the management server 20, the driver assistance control system 10 of each of the driver assistance target vehicles M1 may carry out a part of the collision possibility estimation processing carried out by the management server 20.

It is to be noted that, in this case, the driver assistance network system S1 including the driver assistance control system 10 and the management server 20 constitutes the driver assistance system described above.

(B.2) Second Embodiment (B2.1) Features of this Embodiment

Next, with reference to FIG. 13, features of this embodiment are described.

It is to be noted that FIG. 13 is a system configuration diagram illustrating a configuration of a driver assistance network system S2 of this embodiment.

Moreover, as with FIG. 1 of the first embodiment, FIG. 13 illustrates some of the driver assistance target vehicles M1, the movement prediction target vehicles M2, and the observation systems 30, to prevent complicatedness of the figure.

The driver assistance network system S2 of this embodiment has a feature in providing driver assistance to avoid collision between the driver assistance target vehicle M1 and the movement prediction target vehicle M2 inclusive of a vehicle (hereinafter, referred to as a "parked and stopped target vehicle") M3 parked and stopped in the target area.

It is to be noted that other features of this embodiment than the forgoing are similar to those of the first embodiment, and the same members are denoted by the same reference numerals, and the description thereof is omitted.

Moreover, as illustrated in FIG. 13, the driver assistance network system S2 of this embodiment includes a database server (hereinafter, referred to as a "DB server") 21 together with the driver assistance control system 10 and the management server 20.

The DB server 21 is a server that includes map image data. The map image data includes images of each place in the target area, making it possible to actually observe the real space in association with map data. The DB server 21 provides each piece of the map image data while making the map image data browsable like a map.

In addition to the configuration of the first embodiment, the management server 20 is configured to carry out parked and stopped vehicle information acquisition processing. The parked and stopped vehicle information acquisition processing includes acquiring, as parked and stopped position information, information regarding a parked and stopped position of a specific vehicle in a predetermined area, out of the passing vehicles, separately from the frequency information acquisition processing.

That is, the management server 20 is configured to associate a parked and stopped target vehicle M3 with the identification information such as the registration number of each vehicle, in cooperation with the DB server 21. The parked and stopped target vehicle M3 is possibly parked and stopped in the target area. The management server 20 holds the parked and stopped position information indicating the relevant parked and stopped position.

Thus, upon acquiring the vehicle detection information regarding the movement prediction target vehicle M2 detected by the observation system 30, the management server 20 is configured to carry out, in cooperation with the DB server 21, the collision possibility estimation processing based on the acquired vehicle detection information and the parked and stopped position information.

Specifically, when the movement prediction target vehicle M2 has been detected by any one of the observation systems 30, the management server 20 carries out the determination processing based on the acquired parked and stopped position information. The determination processing includes determining whether or not the relevant movement prediction target vehicle M2 is the parked and stopped target vehicle M3.

Thus, the management server 20 is configured to estimate the possibility of collision between the driver assistance target vehicle M1 and the parked and stopped target vehicle M3 based on a result of the determination processing.

With this configuration, it is possible for the management server 20 of the embodiment to precisely predict the movement of the undetectable vehicle, inclusive of a parking situation in the target area. Hence, it is possible to estimate the collision with the driver assistance target vehicle M1 inclusive of parking and stopping of the movement prediction target vehicle M2.

It is to be noted that the DB server 21 may be a server that includes dynamic map data instead of or in addition to the map data, and provides the dynamic map data to, for example, a vehicle that performs automated driving. The dynamic map data includes information that makes it possible to identify a vehicle on a lane basis, and the additional information to assist in automated travel.

In particular, the dynamic map includes, for example, high-precision three-dimensional geospatial information (basic map information). The high-precision three-dimensional geospatial information is a database-like map in which a vehicle or various kinds of traffic information are added to a high-precision three-dimensional map, and makes it possible to identify, on the lane basis, the position of the subject vehicle on the road and in the surroundings of the road.

Moreover, the dynamic map includes various kinds of additional map information necessary to assist in, for example, the automated travel, e.g., traffic regulation information. In the traffic regulation information, for example, in addition to static information such as a speed limit, dynamic information such as accidents and construction information is included in the high-precision three-dimensional geospatial information.

(B2.2) Management Server

Next, with reference to FIGS. 14 and 15, the management server 20 of this embodiment is described.

It is to be noted that FIG. 14 is a diagram for description of the parked and stopped vehicle information acquisition processing to be carried out by the management server 20 of the embodiment. FIG. 15 is a diagram for description of the collision possibility estimation processing to be carried out by the management server 20 of the embodiment.

The management server 20 of this embodiment has a similar configuration to that of the first embodiment, and the data analyzer 213 and the collision estimation processor 214 further have the following functions.

(Parked and Stopped Vehicle Information Acquisition Processing)

The data analyzer 213 refers, at predetermined timing, to, for example, the image data or the dynamic map data held in the DB server 21, and carries out the parked and stopped vehicle information acquisition processing. The parked and stopped vehicle information acquisition processing includes acquiring the parked and stopped vehicle information to be used in detecting the parked and stopped target vehicle M3.

In particular, the data analyzer 213 detects the parked and stopped position information indicating a position available for parking and stopping in the target area, and information such as the registration number of the parked and stopped vehicle (hereinafter, referred to as "parked and stopped vehicle identification information") based on the image data held in the DB server 21.

Moreover, the data analyzer 213 uses, as the predetermined timing, for example, timing at which the movement prediction target vehicle M2 is detected by any one of the observation systems 30.

For example, the data analyzer 213 identifies a coordinate position (the east longitude and the north latitude) on the road at regular intervals in the target area, and refers to 360-degree image data including the identified coordinate position (data with an elevation angle fixed at 0 degrees at the time of imaging).

Thus, as illustrated in FIG. 14, upon detecting a parked and stopped vehicle in the image data, the data analyzer 213 carries out the parked and stopped vehicle information acquisition processing. The parked and stopped vehicle information acquisition processing includes acquiring the registration number (identification information) of the vehicle, and acquiring the registration number (identification information) of the vehicle, together with the coordinate position, as the parked and stopped vehicle information.

It is to be noted that the data analyzer 213 detects a vehicle present in a parking space on the roadside or a site space outside the road, as the parked and stopped vehicle.

Thus, the data analyzer 213 associates the detected parked and stopped position information and the parked and stopped vehicle identification information with each other, and stores the parked and stopped position information and the parked and stopped vehicle identification information in the vehicle detection information storage 244, as the parked and stopped vehicle information.

(Parking and Stopping Determination Processing and Collision Possibility Estimation Processing)

When detecting the movement prediction target vehicles M2 on one or more predicted routes while carrying out the driver assistance information provision processing, the collision estimation processor 214 refers to the parked and stopped vehicle information held in the vehicle detection information storage 244.

Thus, the collision estimation processor 214 carries out the determination processing. The parking and stopping determination processing includes determining whether or not the detected movement prediction target vehicle M2 is the parked and stopped target vehicle M3, based on the parked and stopped vehicle information.

Moreover, when determining that the movement prediction target vehicle M2 detected by the parking and stopping determination processing is the parked and stopped target vehicle M3, the collision estimation processor 214 carries out the collision possibility estimation processing inclusive of parking and stopping in the target area.

In particular, when the detected movement prediction target vehicle M2 is the parked and stopped target vehicle M3, the collision estimation processor 214 identifies, as the predicted routes, routes from the installation spot of the observation system 30 that has detected the movement prediction target vehicle M2 to the parking position, based on the parked and stopped position information as the additional information to the relevant parked and stopped vehicle information.

Thus, the collision estimation processor 214 determines whether or not the planned travel route of the driver assistance target vehicle M1 crosses the predicted routes to the parking position. When determining that the planned travel route crosses the predicted routes, the collision estimation processor 214 carries out the collision possibility estimation processing similarly to the first embodiment.

Specifically, as illustrated in FIG. 15, as the collision possibility estimation processing, when determining that the planned travel route of the driver assistance target vehicle M1 crosses the predicted routes to the parking position, the collision estimation processor 214 identifies, as the intersection spots, the spots where the planned travel route of the driver assistance target vehicle M1 crosses the predicted routes to the parking position.

Thus, the collision estimation processor 214 identifies the determination reference time of the driver assistance target vehicle M1 at the specific intersection spots, and the determination target time of the parked and stopped target vehicle M3 at the specific intersection spots, and compares the determination reference time with the determination target time.

Moreover, the collision estimation processor 214 estimates the possibility of collision between the driver assistance target vehicle M1 and the parked and stopped target vehicle M3 detected, based on the relation between the determination target time and the determination reference time.

At this occasion, the collision estimation processor 214 determines whether or not the relation between the determination target time and the determination reference time meets the predetermined first condition, and estimates the possibility of collision described above.

It is to be noted that FIG. 15 illustrates an example case where the movement prediction target vehicle M2 is identified as the parked and stopped target vehicle M3, and the planned travel route of the driver assistance target vehicle M1 and the predicted route to the parked and stopped position PP of the parked and stopped target vehicle M3 cross at the specific intersection spot IS3.

Moreover, for example, as with the first embodiment, the collision estimation processor 214 estimates the possibility of collision described above, assuming as the third condition that the determination target time and the determination reference time have the predetermined time difference (for example, the ±10 second difference).

At this occasion, the collision estimation processor 214 determines that the possibility of collision between the driver assistance target vehicle M1 and the parked and stopped target vehicle M3 detected is high, when the third condition is met.

Moreover, the collision estimation processor 214 determines that the possibility of collision between the driver assistance target vehicle M1 and the parked and stopped target vehicle M3 detected is low, when the third condition is not met.

(Provision of Driver Assistance Information)

As with the first embodiment, the driver assistance information providing unit 218 provides the driver assistance control system 10 of the relevant driver assistance target vehicle M1 with the result of the collision possibility estimation processing carried out by the collision estimation processor 214, as the estimation result information.

For example, in the example described above, the driver assistance information providing unit 218 provides the driver assistance control system 10 of the relevant driver assistance target vehicle M1 with any one of the two-phased estimation results: "the possibility of collision is high"; and "the possibility of collision is low", as the estimation result information.

It is to be noted that, as with the first embodiment, upon receiving the phased flag information, the driver assistance control system 10 carries out, based on the kind of the flag information, the driver assistance control processing to provide the driver assistance such as the alarm process to give an alarm to the driver, or the automated driving control.

For example, when acquiring the estimation result "the possibility of collision is high", the driver assistance control system 10 carries out, as the alarm process, the process of giving a notification that "There is high possibility of collision with a vehicle at such and such an intersection spot. Please be careful.".

Moreover, for example, when acquiring the estimation result "the possibility of collision is low", the drive assistance control system 10 carries out, as the alarm process, the process of giving a notification that "please watch out for collision with a vehicle at such and such an intersection spot".

(B2.3) Operation of this Embodiment (Driver Assistance Information Provision Processing)

Next, with reference to FIGS. 16 to 19, description is given of operation of the driver assistance information provision processing to be carried out by the management server 20 of this embodiment.

It is to be noted that FIGS. 16 to 19 are flowcharts illustrating the operation of the driver assistance information provision processing to be carried out by the management server 20 of this embodiment.

This operation is operation to be carried out at every predetermined timing such as the timing of entry into the new target area.

Moreover, this operation is processing when the parked and stopped target vehicle M3 is detected in the driver assistance information provision processing in the first embodiment. Accordingly, similar processes to those in the first embodiment are denoted by the same step numbers, and description thereof is omitted.

Moreover, in this operation, as with the first embodiment, it is assumed that the frequency information including the additional information has been already held in the frequency information storage 243, and the parked and stopped vehicle information has been already held in the vehicle detection information storage 244.

Furthermore, in this operation, it is assumed that the command to provide the driver assistance information in accompaniment with the entry of the vehicle (driver assistance target vehicle) M1 into the new target area has been transmitted from the driver assistance control system 10.

First, upon receiving the command to provide the driver assistance information from the driver assistance control system 10 of the driver assistance target vehicle M1 (step S201), the collision estimation processor 214 acquires the travel route information regarding the driver assistance target vehicle M1 from the relevant driver assistance control system 10 (step S202).

Next, the collision estimation processor 214 identifies the planned travel route of the driver assistance target vehicle M1 based on the travel route information regarding the driver assistance target vehicle M1 (step S203), and identifies each spot combination route that crosses the planned travel route, as the predicted route (step S204).

At this occasion, the collision estimation processor 214 also identifies the specific intersection spots at which the planned travel route and the predicted routes cross.

Next, the collision estimation processor 214 determines whether or not one or more predicted routes have been identified (step S205).

At this occasion, when determining that no predicted routes have been identified, the collision estimation processor 214 causes the flow to proceed to a process of step S311. When determining that one or more predicted routes have been identified, the collision estimation processor 214 causes the flow to proceed to the process of step S207.

Next, the collision estimation processor 214 refers to the frequency information corresponding to each predicted route identified, and estimates, for each specific intersection spot, the arrival time of the driver assistance target vehicle M1 reaching each specific intersection spot, based on the relevant additional information (such as the moving speed) (step S207).

Next, the collision estimation processor 214 determines whether or not the ending condition of this operation has been met, e.g., whether or not the driver assistance target vehicle M1 has passed all the specific intersection spots (step S208). When determining that the ending condition of this operation has been met, the collision estimation processor 214 ends this operation directly.

Meanwhile, when determining that the ending condition of this operation has not been met, the collision estimation processor 214 excludes the specific intersection spot which the driver assistance target vehicle M1 has already passed, and the predicted route in which the relevant specific intersection spot is included in the route, from the targets of the collision possibility estimation processing (step S209).

Next, the collision estimation processor 214 determines, based on the vehicle detection information transmitted from the observation system 30 at the first installation spot of each predicted route, whether or not the movement prediction target vehicle M2 has been detected on each predicted route (step S210).

At this occasion, when determining that the movement prediction target vehicle M2 is detected on one or more predicted routes, the collision estimation processor 214 causes the flow to proceed to a process of step S301. When determining that the movement prediction target vehicle M2 has not been detected on any predicted route, the collision estimation processor 214 causes the flow to proceed to the process of step S208.

Next, when determining that the movement prediction target vehicle M2 has been detected, the collision estimation processor 214 determines whether or not the relevant movement prediction target vehicle M2 is the parked and stopped target vehicle M3, based on the parked and stopped vehicle information held in the vehicle detection information storage 244 (step S301).

At this occasion, when determining that the detected movement prediction target vehicle M2 is the parked and stopped target vehicle M3, the collision estimation processor 214 causes the flow to proceed to a process of step S302. When determining that the movement prediction target vehicle M2 is not the parked and stopped target vehicle M3, the collision estimation processor 214 causes the flow to proceed to the process of step S211.

Next, when determining that the detected movement prediction target vehicle M2 is not the parked and stopped target vehicle M3, the collision estimation processor 214 estimates the arrival time of the relevant movement prediction target vehicle M2 at the specific intersection spot (step S211).

Next, the collision estimation processor 214 compares the arrival time of the driver assistance target vehicle M1 at each specific intersection spot with the arrival time of the relevant movement prediction target vehicle M2, and calculates the time difference (step S212).

Next, the collision estimation processor 214 refers to the frequency information and identifies the frequency of each predicted route (step S213).

Next, the collision estimation processor 214 estimates the phased possibility of collision at each specific intersection spot based on the frequency of each predicted route and the time difference calculated in the process of step S212 (step S214).

Next, the collision estimation processor 214 allows the driver assistance information providing unit 218 to provide the relevant driver assistance control system 10 with the collision possibility flag information indicating the phased possibility of collision with the movement prediction target vehicle M2 (step S215). The collision estimation processor 214 causes the flow to proceed to the process of step S208.

Meanwhile, when determining that the detected movement prediction target vehicle M2 is the parked and stopped target vehicle M3, the collision estimation processor 214 identifies a parking and stopping route (step S302).

That is, the collision estimation processor 214 identifies the parking and stopping route from the position of the observation system 30 where the parked and stopped target vehicle M3 is detected to the parked and stopped position, based on the parked and stopped vehicle information.

Next, the collision estimation processor 214 determines presence or absence of any specific intersection spots where the travel route of the driver assistance target vehicle M1 and the parking and stopping route identified in the process of step S302 cross (step S303).

At this occasion, when determining that there is no specific intersection spots, the collision estimation processor 214 causes the flow to proceed to a process of step S310. When determining that the specific intersection spot is present, the collision estimation processor 214 causes the flow to proceed to a process of step S304.

Thus, when determining that there are no specific intersection spots, the collision estimation processor 214 determines presence or absence of any predicted routes identified (step S310).

At this occasion, when determining that a predicted route has been identified, the collision estimation processor 214 causes the flow to proceed to the process of step S208. When determining that no predicted routes have been identified, the collision estimation processor 214 causes the flow to proceed to the process of step S311.

Next, when determining that the specific intersection spot is present, the collision estimation processor 214 estimates the arrival time of the driver assistance target vehicle M1 at the specific intersection spot based on the travel route information regarding the driver assistance target vehicle M1 (step S304).

Next, the collision estimation processor 214 estimates the arrival time of the parked and stopped target vehicle M3 at the specific intersection spot, based on the parking and stopping route, based on the moving speed when the parked and stopped target vehicle M3 is detected by the observation system 30 (step S305).

Next, the collision estimation processor 214 compares the arrival time of the driver assistance target vehicle M1 at the specific intersection spot with the arrival time of the relevant parked and stopped target vehicle M3, and calculates the time difference (step S306).

Next, the collision estimation processor 214 estimates the phased possibility of collision at each intersection spot based on the time difference calculated in the process of step S212 (step S307), and causes the flow to proceed to the process of step S215.

Meanwhile, in the process of step S205, when determining that no predicted routes have been identified, the collision estimation processor 214 determines whether or not the ending condition of this operation has been met, e.g., whether or not the driver assistance target vehicle M1 has entered a new target area (step S311).

At this occasion, when determining that the ending condition of this operation has been met, the collision estimation processor 214 ends this operation directly. When determining that the ending condition has not been met, the collision estimation processor 214 causes the flow to proceed to a process of step S312.

Next, the collision estimation processor 214 determines, based on the vehicle detection information transmitted from each of the observation systems 30, whether or not each of the observation systems 30 has detected the movement prediction target vehicle M2 (step S312).

At this occasion, when determining that the movement prediction target vehicle M2 has been detected, the collision estimation processor 214 causes the flow to proceed to a process of step S313. When determining that the movement prediction target vehicle M2 has not been detected, the collision estimation processor 214 causes the flow to return to the process of step S311.

Next, when determining that the movement prediction target vehicle M2 has been detected, the collision estimation processor 214 determines whether or not the relevant movement prediction target vehicle M2 is the parked and stopped target vehicle M3 based on the parked and stopped vehicle information held in the vehicle detection information storage 244 (step S313).

At this occasion, when determining that the relevant movement prediction target vehicle M2 is the parked and stopped target vehicle M3, the collision estimation processor 214 causes the flow to proceed to the process of step S302. When determining that the relevant movement prediction target vehicle M2 is not the parked and stopped target vehicle M3, the collision estimation processor 214 causes the flow to return to the process of step S311.

(B2.4) Modification Examples

In the forgoing embodiment, as with the first embodiment, various modification examples are applicable.

Moreover, in the forgoing embodiment, the vehicle detection information is detected by each observation system 30, but the management server 20 may detect the vehicle detection information based on the image data acquired from each observation system 30.

(C) Other

The embodiments of the disclosure are not limited to those described in the forgoing embodiments, but various modifications may be made. For example, as for terms cited as broad or synonymous terms in a statement in the description or the drawings, replacements may be made with the broad or synonymous terms in other statements in the description or the drawings.

Embodiments of the disclosure include substantially the same configurations as the configurations described in the forgoing embodiments (for example, configurations having the same function, method, and result, or configurations having the same object and effects).

Moreover, the embodiments of the disclosure include configurations in which non-essential portions of the configurations described in the forgoing embodiments are replaced.

Furthermore, the embodiments of the disclosure include a configuration that makes it possible to produce the same workings and effects as the configuration described in the forgoing embodiments, or a configuration that makes it possible to achieve the same object.

In addition, the embodiments of the disclosure include a configuration in which known techniques are added to the configurations described in the forgoing embodiments.

Although embodiments of the disclosure have been described in detail in the foregoing, it should be appreciated that many modifications and alterations may be made by persons skilled in the art without substantially departing from the new matters and the effects of the invention. Accordingly, the embodiments of the disclosure are intended to include all of such modifications and alterations.

DESCRIPTION OF REFERENCE NUMERALS

M1 Driver assistance target vehicle
M2 Movement prediction target vehicle
M3 Parked and stopped target vehicle
S1, S2 Driver assistance network system
10 Driver assistance system
20 Management server
21 DB server
30 Observation system
110 Processor
111 Communication controller
112 Operation acceptance processor
113 Driver assistance control processor
114 Travel-related information providing unit
120 Operation input unit
140 Storage
141 Main storage
142 Data storage
150 Information storage medium
170 Communication unit
210 Processor
211 Communication processor
212 Data obtainer
213 Data analyzer
214 Collision estimation processor
218 Driver assistance information providing unit
219 Timer manager
240 Storage
241 Main storage
242 Data storage
243 Frequency information storage
244 Vehicle detection information storage
250 Information storage medium
270 Communication unit
310 Imaging camera
320 Sensor management device
321 Sensor communication unit
322 Sensor processor
323 Sensor storage
325 Communication controller
326 Camera controller
327 Image processor
329 Timer manager

The invention claimed is:

1. A driver assistance system configured to assist in driving a vehicle, the driver assistance system comprising:
one or more processors; and
one or more memories communicatably coupled to the one or more processors, wherein
the one or more processors are configured to
upon providing the vehicle with driver assistance in a predetermined area that is an area including installation spots at which respective observation sensors are installed and in which travel routes are present from a first installation spot to a second installation spot out of the installation spots, the second installation spot being different from the first installation spot,
carry out information acquisition processing of acquiring frequency information for each combination of the first installation spot and the second installation spot, the frequency information indicating frequency at which passing vehicles that have passed the first installation spot pass the second installation spot;
carry out estimation processing of estimating possibility of collision between the vehicle of which a planned travel route in the predetermined area is recognizable, and a random vehicle devoid of a road-to-vehicle communication function to communicate with the observation sensors, based on each piece of the acquired frequency information for each combination of the installation spots, and
based on the estimated possibility of collision, carry out automated driving control including at least one of driving force control, steering control, and braking control of the vehicle to avoid the collision.

2. The driver assistance system according to claim 1, wherein
the one or more processors are configured to
carry out collection processing of collecting, as vehicle detection information, information detected by the observation sensors and related to the passing vehicles that have passed respective ones of the installation spots, and
carry out, as the information acquisition processing, calculation processing of calculating the frequency for each combination of the installation spots, based on the vehicle detection information regarding each of the passing vehicles.

3. The driver assistance system according to claim 1, wherein
the one or more processors are configured to
acquire subject-vehicle travel information and travel route information, the subject-vehicle travel information indicating information regarding a position of the vehicle and the planned travel route of the vehicle in the predetermined area, and the travel route information indicating information regarding travel routes of the passing vehicles including the first installation spot and the second installation spot, and
as the estimation processing, identify intersection spots at which the planned travel route and the travel routes cross, based on the subject-vehicle travel information and the travel route information, estimate arrival time of the vehicle at each of the intersection spots, based on the subject-vehicle travel information, when the random vehicle different from the vehicle is detected by any one of the observation sensors installed on the travel routes, acquire vehicle detection information regarding the random vehicle detected by the one of the observation sensors, estimate arrival time of the random vehicle at each of the intersection spots, based on the vehicle detection information and the frequency information, calculate a time difference between a planned arrival time of the vehicle at the intersection spot and a planned arrival time of the random vehicle, and estimate the possibility of collision between the subject vehicle and the random vehicle, based on information regarding the calculated time difference.

4. The driver assistance system according to claim 1, wherein
the one or more processors are configured to
carry out notification processing of notifying the vehicle of the possibility of collision with the random vehicle.

5. The driver assistance system according to claim 1, wherein
the one or more processors are configured to
carry out parking and stopping information acquisition processing of acquiring, as parked and stopped position information, information regarding a parked and stopped position of a specific vehicle in the predetermined area, out of the passing vehicles, and
when the random vehicle different from the vehicle is detected by any one of the observation sensors installed on the travel routes, carry out determination processing of determining whether or not the random vehicle is the specific vehicle, based on the acquired parked and stopped position information, to estimate possibility of collision between the vehicle and the specific vehicle based on a result of the determination processing.

6. The driver assistance system according to claim 5, wherein
the one or more processors are configured to
as the estimation processing, when the random vehicle is the specific vehicle, identify a route of the specific vehicle based on the parked or stopped position in a corresponding piece of the parked and stopped position information, and
estimate the possibility of collision between the vehicle and the specific vehicle based on the identified route.

7. A vehicle provided with a driver assistance apparatus configured to assist in driving the vehicle, wherein
the driver assistance apparatus is configured to
upon providing the vehicle with driver assistance in a predetermined area that is an area including installation spots at which respective observation sensors are installed and in which travel routes are present from a first installation spot to a second installation spot out of the installation spots, the second installation spot being different from the first installation spot, carry out information acquisition processing of acquiring frequency information for each combination of the first installation spot and the second installation spot, the frequency information indicating frequency at which passing vehicles that have passed the first installation spot pass the second installation spot;

carry out estimation processing of estimating possibility of collision between the vehicle of which a planned travel route in the predetermined area is recognizable, and a random vehicle devoid of a road-to-vehicle communication function to communicate with the observation sensors, based on each piece of the acquired frequency information for each combination of the installation spots, and based on the estimated possibility of collision, carry out automated driving control including at least one of driving force control, steering control, and braking control of the vehicle to avoid the collision.

8. A non-transitory recording medium containing a computer program to be applied to a driver assistance apparatus that assists in driving a vehicle,
the computer program causing a computer to:
when providing the vehicle with driver assistance in a predetermined area that is an area including installation spots at which respective observation sensors are installed and in which travel routes are present from a first installation spot to a second installation spot out of the installation spots, the second installation spot being different from the first installation spot, carry out information acquisition processing of acquiring frequency information for each combination of the first installation spot and the second installation spot, the frequency information indicating frequency at which passing vehicles that have passed the first installation spot pass the second installation spot;

carry out estimation processing of estimating possibility of collision between the vehicle of which a planned travel route in the predetermined area is recognizable, and a random vehicle devoid of a road-to-vehicle communication function to communicate with the observation sensors, based on each piece of the acquired frequency information for each combination of the installation spots, and based on the estimated possibility of collision, carry out automated driving control including at least one of driving force control, steering control, and braking control of the vehicle to avoid the collision.

9. A driver assistance method including assisting in driving a vehicle, the driver assistance method comprising:
when providing the vehicle with driver assistance in a predetermined area that is an area including installation spots at which respective observation sensors are installed and in which travel routes are present from a first installation spot to a second installation spot out of the installation spots, the second installation spot being different from the first installation spot, carrying out information acquisition processing of acquiring frequency information for each combination of the first installation spot and the second installation spot, the frequency information indicating frequency at which passing vehicles that have passed the first installation spot pass the the second installation spot;

carrying out estimation processing of estimating possibility of collision between the vehicle of which a planned travel route in the predetermined area is recognizable, and a random vehicle devoid of a road-to-vehicle communication function to communicate with the observation sensors, based on each piece of the acquired frequency information for each combination of the installation spots, and based on the estimated possibility of collision, carry out automated driving control including at least one of driving force control, steering control, and braking control of the vehicle to avoid the collision.

* * * * *